(12) United States Patent
Fujishima et al.

(10) Patent No.: US 8,677,501 B2
(45) Date of Patent: Mar. 18, 2014

(54) PRIVILEGE VIOLATION DETECTING PROGRAM

(75) Inventors: Yuki Fujishima, Kawasaki (JP); Nobuyuki Kanaya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 415 days.

(21) Appl. No.: 12/694,177

(22) Filed: Jan. 26, 2010

(65) Prior Publication Data
US 2010/0192229 A1 Jul. 29, 2010

(30) Foreign Application Priority Data
Jan. 27, 2009 (JP) ................. 2009-015018

(51) Int. Cl.
*G06F 21/50* (2013.01)
*G06F 21/52* (2013.01)

(52) U.S. Cl.
USPC .................. 726/26; 726/30; 713/189

(58) Field of Classification Search
None
See application file for complete search history.

(56) References Cited

U.S. PATENT DOCUMENTS

| 5,802,291 | A * | 9/1998 | Balick et al. ................. 709/202 |
| 6,802,054 | B2 * | 10/2004 | Faraj ............................ 717/128 |
| 7,363,275 | B2 | 4/2008 | Kojima |
| 7,814,544 | B1 * | 10/2010 | Wilhelm ....................... 726/22 |
| 2002/0087949 | A1 * | 7/2002 | Golender et al. ............ 717/124 |
| 2006/0294592 | A1 * | 12/2006 | Polyakov et al. ............. 726/24 |
| 2007/0198997 | A1 * | 8/2007 | Jacops et al. ................. 719/328 |
| 2007/0234305 | A1 * | 10/2007 | Mishra et al. ................ 717/128 |
| 2008/0016339 | A1 * | 1/2008 | Shukla ......................... 713/164 |
| 2008/0104663 | A1 | 5/2008 | Tokutani |
| 2008/0127110 | A1 * | 5/2008 | Ivanov et al. ................ 717/128 |
| 2009/0024381 | A1 * | 1/2009 | Sakamoto et al. ............. 703/26 |
| 2010/0088683 | A1 * | 4/2010 | Golender et al. ............ 717/128 |

FOREIGN PATENT DOCUMENTS

| JP | 2003-186708 A | 7/2003 |
| JP | 2007-226495 A | 9/2007 |
| JP | 2008-117026 A | 5/2008 |

OTHER PUBLICATIONS

Pistoia, M.; Chandra, S.; Fink, S. J.; Yahav, E.; , "A survey of static analysis methods for identifying security vulnerabilities in software systems," IBM Systems Journal , vol. 46, No. 2, pp. 265-288, 2007.*

Xu, Haizhi, Du, Wenliang, Chapin, Steve, "Context Sensitive Anomaly Monitoring of Process Control Flow to Detect Mimicry Attacks and Impossible Paths", Recent Advances in Intrusion Detection, Lecture Notes in Computer Science, 2004, Springer Berlin/Heidelberg, pp. 21-38, vol. 3224.*

* cited by examiner

*Primary Examiner* — Jeffery Williams
(74) *Attorney, Agent, or Firm* — Fujitsu Patent Center

(57) ABSTRACT

A privilege violation detecting program stored on a computer-readable medium causes a computer to detect a privilege violation of an test target program by receiving an authority request API from an authority request API trace log storing unit; reading out, from an object access rule storing unit, an assumed access API assumed to be output in response to the received authority request API; determining an actual access API returned in response to the received authority request API from the actual access API trace log storing unit; and storing, into a least privilege violation data storing unit, data of the received authority request API when the actual access API returned in response received authority request API does not match the read out assumed access API.

9 Claims, 29 Drawing Sheets

FIG.3

```
/*                                                               */
/* FORMAT OF SAMPLING RULE OF ACCESS AUTHORITY REQUEST API TO OBJECT */
/*                                                               */

[SAMPLING TARGET API]
REQUEST AUTHORITY NAME 1
REQUEST AUTHORITY NAME 2
  ..

[DATA ITEM TO BE RECORDED]
TRACE NUMBER
API NAME
ARGUMENT
SELF PROCESS ID
THREAD ID
API CALLING DATE AND TIME
EXECUTING ACCOUNT
USER GROUP
PRIVILEGE
ACCESS TARGET OBJECT PATH
PERMISSION OF OBJECT
```

FIG.4

```
/*                                                          */
/* EXAMPLE OF SAMPLING RULE OF ACCESS AUTHORITY REQUEST API TO OBJECT */
/*                                                          */
[TargetAPIs]
errno_t _sopen_s( int* pfh, const char *filename, int oflag, int
shflag, int pmode )

virtual BOOL CFile::Open( LPCTSTR lpszFileName, UINT nOpenFlags,
CFileException* pError = NULL )

BOOL LookupPrivilegeValue( LPCTSTR lpSystemName, LPCTSTR lpName, PLUID
lpLuid)

BOOL WINAPI SetSecurityDescriptorDacl( __inout PSECURITY_DESCRIPTOR
pSecurityDescriptor, __in BOOL bDaclPresent, __in_opt PACL pDacl, __in
BOOL bDaclDefaulted )

:
[TraceData]
TraceNO
API
Parameters
OwnProcessID
OwnThreadID
Time
UserAccount
Group
Privilege
ObjectPath
ObjectPermission
```

FIG.5

```
/*                                                          */
/* FORMAT OF SAMPLING RULE OF ACCESS EXECUTING API TO OBJECT */
/*                                                          */
[SAMPLING TARGET API]
OBJECT ACCESS 1
OBJECT ACCESS 2
OBJECT ACCESS 3
OBJECT ACCESS 4
  :
  :

[DATA ITEM TO BE RECORDED]
TRACE NUMBER
API NAME
ARGUMENT
PARENT PROCESS ID
SELF PROCESS ID
THREAD ID
API CALLING DATE AND TIME
EXECUTING ACCOUNT
USER GROUP
PRIVILEGE
ACCESS TARGET OBJECT PATH
PERMISSION OF OBJECT
```

FIG.6

```
/*                                                                    */
/* EXAMPLE OF SAMPLING RULE OF ACCESS EXECUTING API TO OBJECT         */
/*                                                                    */
[TargetAPIs]
long _lseek( int fd, long offset, int origin );

int _read( int fd, void *buffer, unsigned int count )

int _write( int fd, const void *buffer, unsigned int count )

virtual UINT CFile::Read( void* lpBuf, UINT nCount )

BOOL ExitWindowsEx( UINT uFlags, DWORD dwReserved )

BOOL WINAPI SetSecurityDescriptorDacl( __inout PSECURITY_DESCRIPTOR
pSecurityDescriptor, __in BOOL bDaclPresent, __in_opt PACL pDacl, __in
BOOL bDaclDefaulted )
       :

[TraceData]
TraceNO
API
Parameters
ParentProcessID
OwnProcessID
OwnThreadID
Time
UserAccount
Group
Privilege
ObjectPath
ObjectPermission
```

FIG.7

```
/*                                              */
/* OBJECT ACCESS PERMITTED BY AUTHORITY         */
/*                                              */
REQUEST AUTHORITY NAME 1, ADDITIONAL SEARCH CONDITION, WATCHING CONDITION a, OBJECT ACCESS NAME 1, WATHING CONDITION b
REQUEST AUTHORITY NAME 2, ADDITIONAL SEARCH CONDITION, WATCHING CONDITION a, OBJECT ACCESS NAME 2, WATHING CONDITION b
REQUEST AUTHORITY NAME 3, ADDITIONAL SEARCH CONDITION, WATCHING CONDITION a, OBJECT ACCESS NAME 3, WATHING CONDITION b
REQUEST AUTHORITY NAME 4, ADDITIONAL SEARCH CONDITION, WATCHING CONDITION a, OBJECT ACCESS NAME 4, WATHING CONDITION b
REQUEST AUTHORITY NAME 5, ADDITIONAL SEARCH CONDITION, WATCHING CONDITION a, OBJECT ACCESS NAME 5, WATHING CONDITION b
REQUEST AUTHORITY NAME 6, ADDITIONAL SEARCH CONDITION, WATCHING CONDITION a, OBJECT ACCESS NAME 6, WATHING CONDITION b
                                      . .
```

FIG.8

```
/*                                            */
/* OBJECT ACCESS PERMITTED BY AUTHORITY        */
/*                                            */

"errno_t _sopen_s( int* pfh, const char *filename, int oflag, int shflag, int pmode )", "oflag =
_O_RDONLY", "Parameters.pfh=*", , "int _read( int fd, void *buffer, unsigned int count)",
"Parameters.fd=*", "errno_t _sopen_s( int* pfh, const char *filename, int oflag, int shflag, int pmode )", "oflag =
_O_RDWR", "Parameters.pfh=*", , "int _write(int fd, const void *buffer, unsigned int count)",
"Parameters.fd=*", "BOOL LookupPrivilegeValue( LPCTSTR lpSystemName, LPCTSTR lpName, PLUID
lpLuid)", , "Parameters.lpName= "SeShutdownPrivilege"" , "BOOL ExitWindowsEx( UINT uFlags, DWORD
dwReserved )", , "BOOL WINAPI SetSecurityDescriptorDacl( __inout PSECURITY_DESCRIPTOR pSecurityDescriptor, __in BOOL
bDaclPresent, __in_opt PACL pDacl, __in BOOL bDaclDefaulted)", , "Parameters.bDaclPresent==TRUE,
Parameters.bDaclDefaulted=FALSE", , "BOOL WINAPI SetSecurityDescriptorDacl( __inout PSECURITY
_DESCRIPTOR pSecurityDescriptor, __in_opt PACL pDacl, __in BOOL
bDaclDefaulted)", pDacl!=NULL
```

FIG.9

| PRIVILEGE | ASSUMED ACCESS API |
|---|---|
| SYSTEMTIME | "BOOL SetSystemTime(CONST SYSTEMTIME */pSystemTime)" |
| SHUTDOWN | "BOOL ExitWindowsEx( UINT uFlags, DWORD dwReserved )" |
| .... | .... |

FIG.10

| PRIVILEGE | EXPLANATION |
|---|---|
| CREATE_TOKEN | CREATE A TOKEN OBJECT |
| ASSIGNPRIMARYTOKEN | REPLACE A PROCESS LEVEL TOKEN |
| LOCK_MEMORY | LOCK PAGES IN MEMORY |
| INCREASE_QUOTA | ADJUST MEMORY QUOTAS FOR A PROCESS |
| UNSOLICITED_INPUT | READ UNSOLICITED INPUT FROM A TERMINAL DEVICE |
| MACHINE_ACCOUNT | ADD WORKSTATION TO DOMAIN |
| TCB | ACT AS PART OF THE OPERATING SYSTEM |
| SECURITY | MANAGE AUDITING AND SECURITY LOG |
| TAKE_OWNERSHIP | TAKE OWNERSHIP OF FILES OR OTHER OBJECTS |
| LOAD_DRIVER | LOAD AND UNLOAD DEVICE DRIVERS |
| SYSTEM_PROFILE | PROFILE SYSTEM PERFORMANCE |
| SYSTEMTIME | CHANGE THE SYSTEM TIME |
| PROF_SINGLE_PROCESS | PROFILE SINGLE PROCESS |
| INC_BASE_PRIORITY | INCREASE SCHEDULING PRIORITY |
| CREATE_PAGEFILE | CREATE A PAGEFILE |
| CREATE_PERMANENT | CREATE PERMANENT SHARED OBJECTS |
| BACKUP | BACK UP FILES AND DIRECTORIES |
| RESTORE | RESTORE FILES AND DIRECTORIES |
| SHUTDOWN | SHUTDOWN THE SYSTEM |
| DEBUG | DEBUG PROGRAMS |
| AUDIT | GENERATE SECURITY AUDITS |
| SYSTEM_ENVIRONMENT | MODIFY FIRMWARE ENVIRONMENT VALUES |
| CHANGE_NOTIFY | BYPASS TRAVERSE CHECKING |
| REMOTE_SHUTDOWN | FORCE SHUTDOWN FROM A REMOTE SYSTEM |
| UNDOCK | REMOVE COMPUTER FROM DOCKING STATION |
| SYNC_AGENT | SYNCHRONIZE DIRECTORY SERVICE DATA |
| ENABLE_DELEGATION | ENABLE COMPUTER AND USER ACCOUNTS TO BE TRUSTED FOR DELEGATION |
| MANAGE_VOLUME | PERFORM VOLUME MAINTENANCE TASKS |
| IMPERSONATE | IMPERSONATE A CLIENT AFTER AUTHENTICATION |
| CREATE_GLOBAL | CREATE GLOBAL OBJECTS |

FIG.13

| FILE NAME | PID | USER NAME | START DATE AND TIME | END DATE AND TIME |
|---|---|---|---|---|
| PG1.exe | 1001 | Administrator | MM/DD/YYYY | MM/DD/YYYY |
| PG2.exe | 1002 | Administrator | MM/DD/YYYY | MM/DD/YYYY |
| PG3.exe | 1003 | user 1 | MM/DD/YYYY | MM/DD/YYYY |

CANCEL

FIG.14

```
FILE NAME : PG1.exe
PID : 1001
USER NAME : Administrator
USER GROUP NAME : Administrators, Debbuger Users
START DATE AND TIME : MM/DD/YYYY
END DATE AND TIME : MM/DD/YYYY
COMPREHENSIVE EVALUATION : VIOLATE MINIMUM AUTHORITY.
ERR : 3
------------------------------------------------------
[ERR] UNJUST PERMISSION/ACCESS-PERMITTED OBJECT IS CREATED. REQUEST AUTHORITY : " C:¥Documents and Settings¥All Users¥file_001.txt" ,NULL DACL
[ERR] NEEDLESS AUTHORITY IS REQUESTED. REQUEST AUTHORITY : Administrator, CreateFile(),BACKUP
[ERR] REQUEST AUTHORITY IS EXCESSIVE. REQUEST AUTHORITY : Administrator, "C:¥xxxxxx¥xxxxx1.txt" , Write
 ..
```

FIG.16

```
"001", "errno_t _sopen_s( int* pfh, const char *filename, int oflag, int shflag, int pmode )",
"pfh=x:¥xxxx¥xxxx, filename=xxxx.log, oflag=_O_RDWR, shflag=xx, pmode=_S_IREAD | _S_IWRITE",
"1000", "2000", "yyyy/mm/dd hh:mm:ss.ss" , "Administrator" , "Administrator",
"SE_SHUTDOWN_NAME | SE_BACKUP_NAME" , "x:¥xxxx¥xxxx¥xxxx.log" "Administrator=_O_RDWR"
, "002" "BOOL LookupPrivilegeValue( LPCTSTR lpSystemName, LPCTSTR lpName, PLUID lpLuid)",
"lpSystemName =xxxx, lpName=xxxx, lpLuid=xxxx" "1001", "2001" "yyyy/mm/dd hh:mm:ss.ss",
"Administrator" , "Administrator", "SE_SHUTDOWN_NAME | SE_BACKUP_NAME" ,
, "003" "BOOL WINAPI SetSecurityDescriptorDacl( __inout PSECURITY_DESCRIPTOR pSecurityDescriptor,
__in BOOL bDaclPresent, __in_opt PACL pDacl, __in BOOL bDaclDefaulted )" "bDaclPresent =xxxx",
"pDacl=xxxx" , "bDaclDefaulted=xxxx" , "1002" , "2002" , "yyyy/mm/dd hh:mm:ss.ss",
"Administrator" , "Administrator", "SE_SHUTDOWN_NAME | SE_BACKUP_NAME" ,
,
```

FIG.17

```
"001", "int _read(int fd, void *buffer, unsigned int count)", "fd=xxxx, count=xxxxx",
"1000", "1000", "2000", "yyyy/mm/dd hh:mm:ss", "Administrator", "Administrators",
"SE_SHUTDOWN_NAME | SE_BACKUP_NAME", "x:¥xxxx¥xxxx¥xxxx.log", "Administrator=O_RDWR,
User01=O_RDONLY"

"002", "BOOL ExitWindowsEx( UINT uFlags, DWORD dwReserved )", "uFlags=xxxx,
dwReserved=xxxx", "1001", "1001", "2001", "yyyy/mm/dd hh:mm:ss.ss", "Administrator",
"Administrators", "SE_SHUTDOWN_NAME | SE_BACKUP_NAME", "003", "BOOL WINAPI SetSecurityDescriptorDacl(__inout PSECURITY_DESCRIPTOR
pSecurityDescriptor, __in BOOL bDaclPresent, __in_opt PACL pDacl, __in BOOL bDaclDefaulted )",
"pSecurityDescriptor=xxxx, bDaclPresent=xxxx, pDacl=xxxxx, bDaclDefaulted=xxxx", "1002",
"1002", "2002", "yyyy/mm/dd hh:mm:ss.ss", "Administrator", "Administrators",
"SE_SHUTDOWN_NAME | SE_BACKUP_NAME",
```

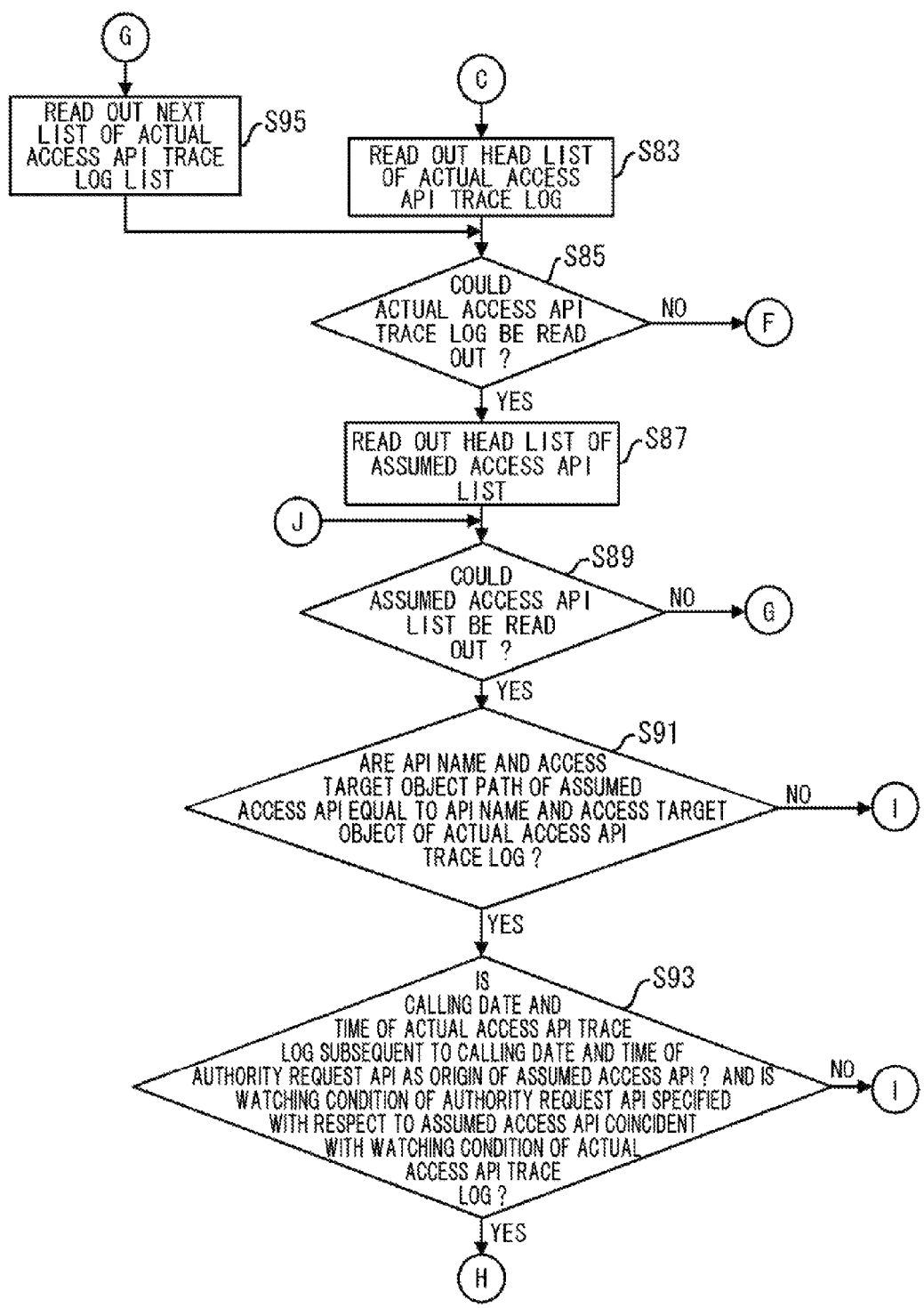

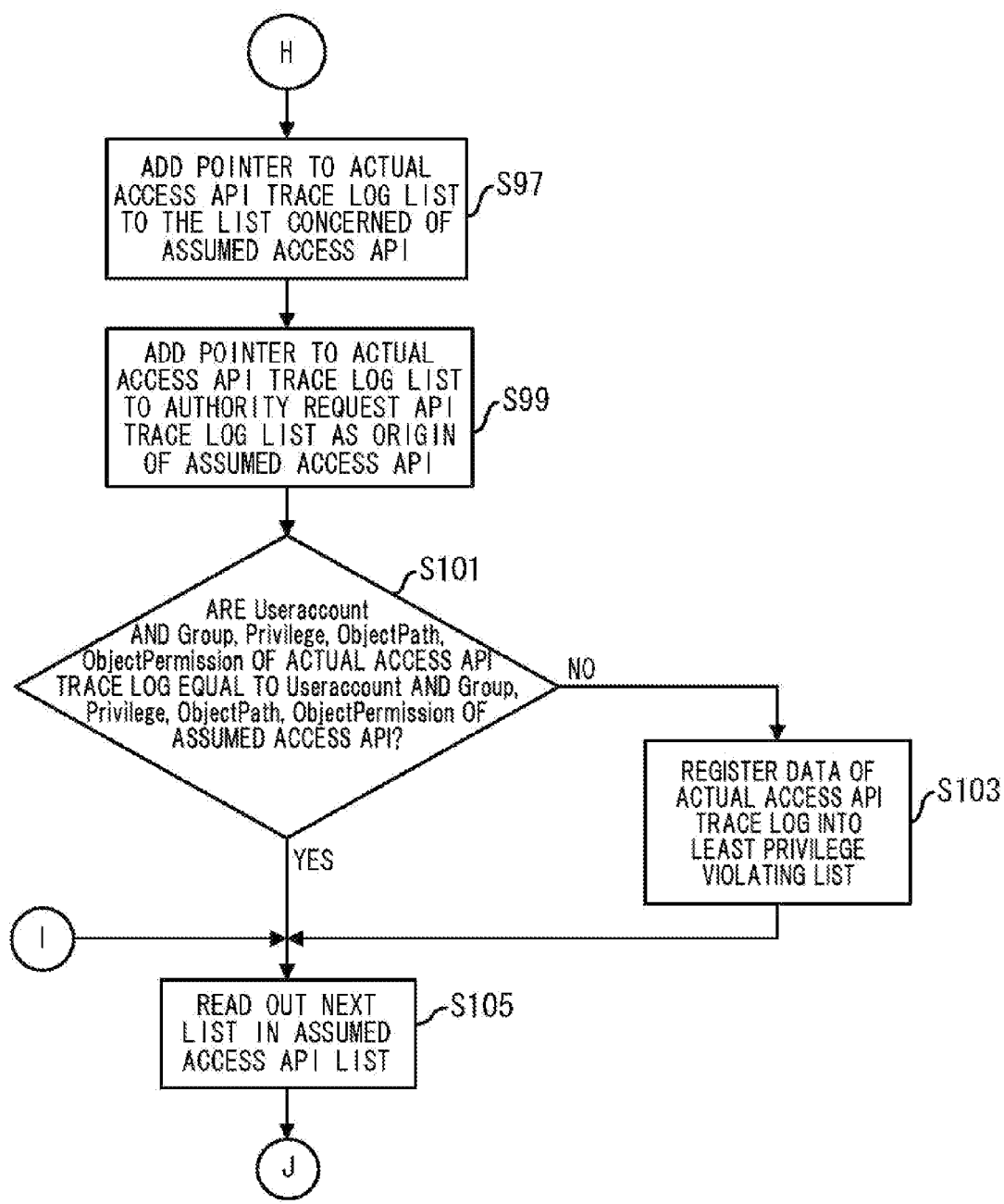

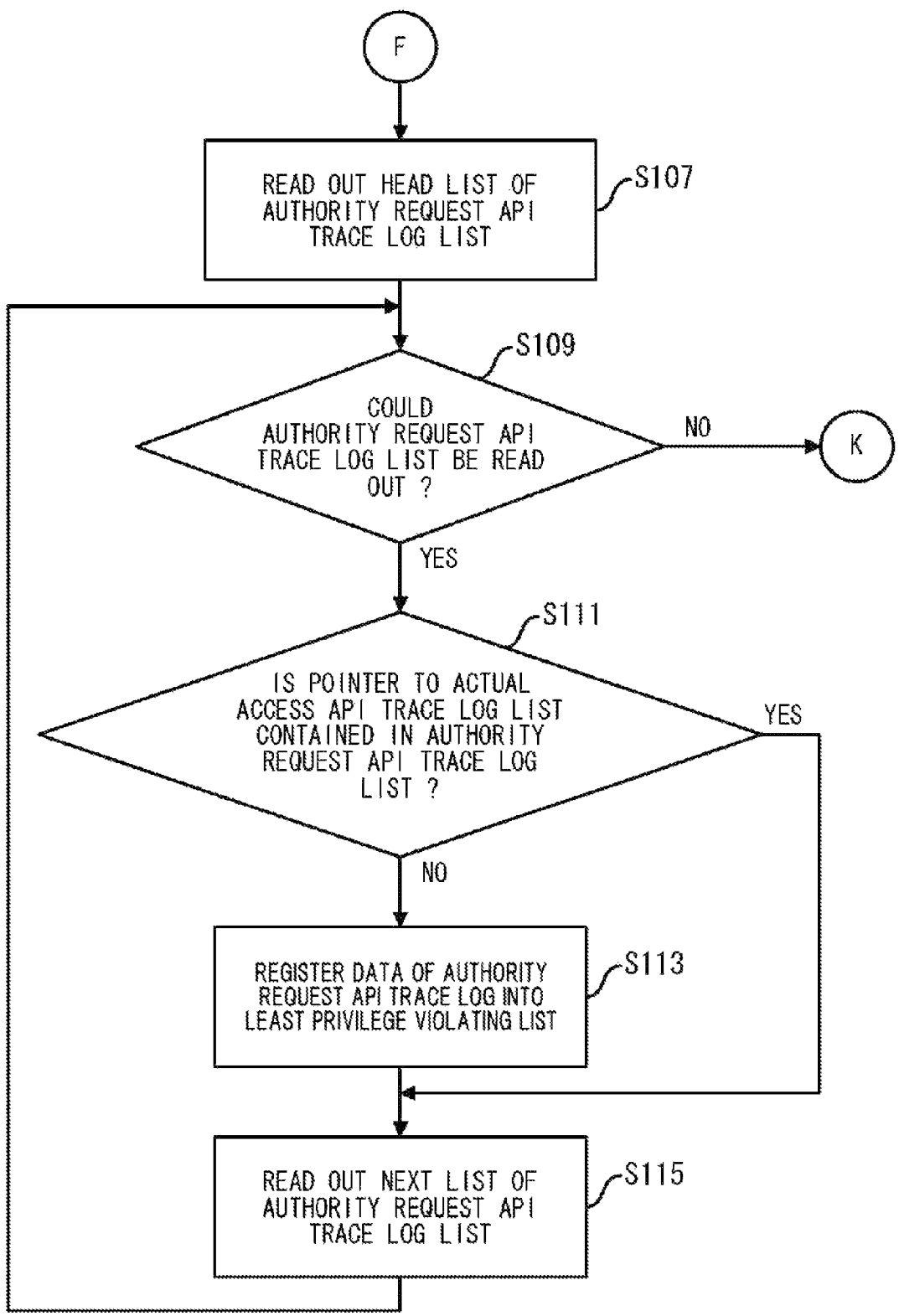

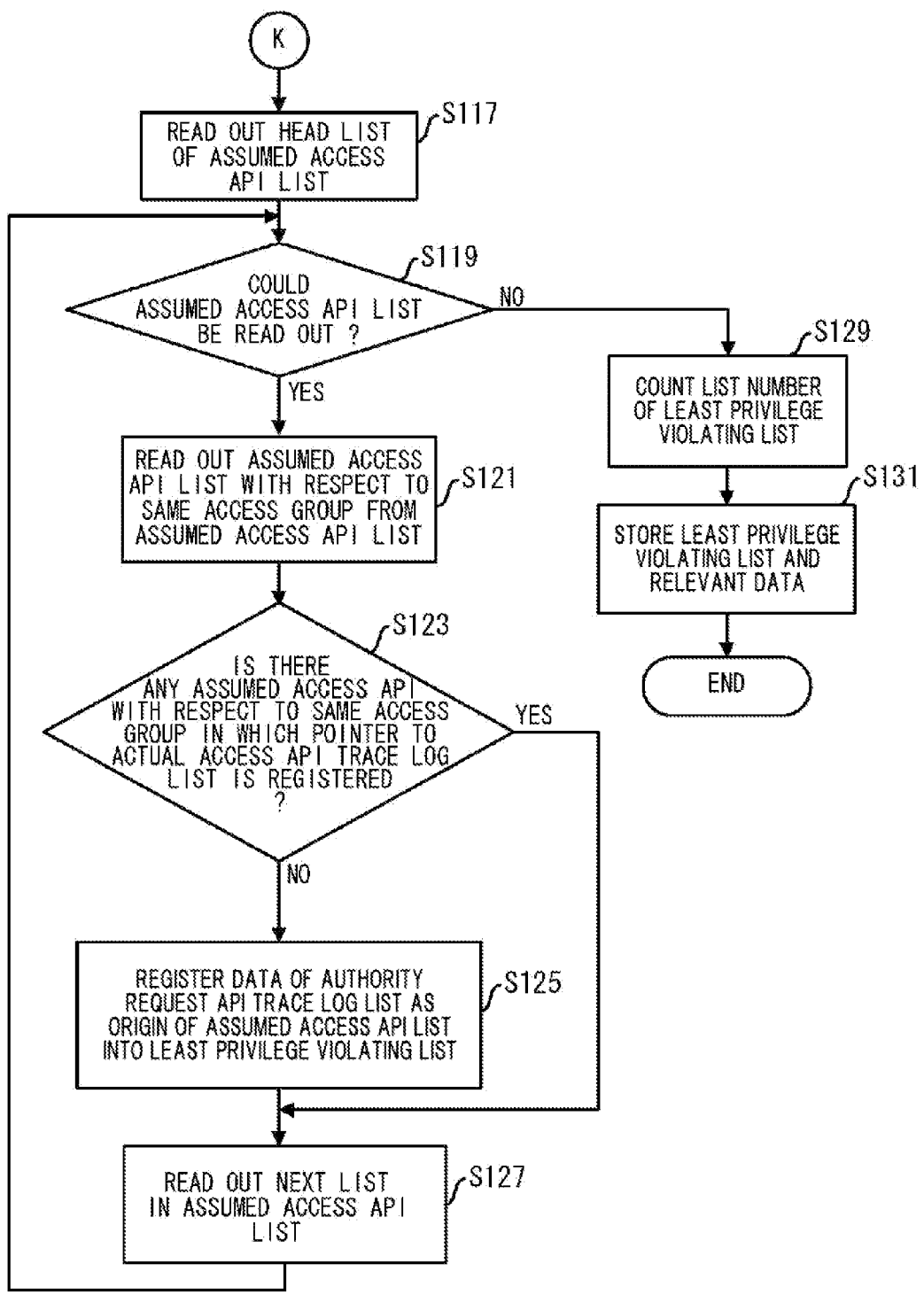

FIG.19

| TraceNo |
|---|
| API |
| Parameters |
| OwnProcessID |
| OwnThreadID |
| Time |
| UserAccount |
| Group |
| Privilege |
| ObjectPath |
| ObjectPermission |
| POINTER TO ASSUMED ACCESS API |
| POINTER TO POINTER LIST TO ACTUAL ACCESS API TRACE LOG |
| POINTER TO NEXT AUTHORITY REQUEST API LIST |

FIG.20

| TraceNo |
|---|
| API |
| Parameter |
| ParentProcessID |
| OwnProcessID |
| OwnThreadID |
| Time |
| UserAccount |
| Group |
| Privilege |
| ObjectPath |
| ObjectPermission |
| POINTER TO NEXT ACTUAL ACCESS API LIST |

FIG.21

| |
|---|
| API |
| Parameter |
| UserAccount |
| Group |
| Privilege |
| ObjectPath |
| ObjectPermission |
| AccessGroup |
| WATCHING CONDITION a |
| WATCHING CONDITION b |
| POINTER TO AUTHORITY REQUEST API |
| POINTER TO POINTER LIST TO ACTUAL ACCESS API TRACE LOG |
| POINTER TO NEXT ASSUMED ACCESS API LIST |

FIG.22

| API |
|---|
| Parameter |
| ParentProcessID |
| OwnProcessID |
| OwnThreadID |
| Time |
| UserAccount |
| Group |
| Privilege |
| ObjectPath |
| ObjectPermission |
| POINTER TO NEXT LEAST PRIVILEGE VIOLATING LIST |

PRIVILEGE VIOLATION DETECTING PROGRAM

CROSS-REFERENCE TO RELATED APPLICATIONS

This application is based upon and claims the benefit of priority from the prior Japanese Patent Application No. 2009-15018 filed on Jan. 27, 2009, the entire contents of which are incorporated herein by reference.

FIELD

The embodiments discussed herein relate to a technique of detecting a request for or use of a privilege (or authority) which is unnecessary for the operation of a program.

BACKGROUND

When a program is created in conformity with a specification requested by a customer, it is required to avoid violation of the least privilege. That is, the following three points are required: (1) The program does not have privilege without which the program runs; (2) the program does not request a privilege without which the program runs; (3) the program does not set into an object any permission without which the program runs. When a program which would violate the least privilege is created, (a) a program having a needlessly much privilege may be created, and thus a critical damage in which the overall system is captured or the like may occur. Furthermore, (b) when a security problem occurs in the system, a program having a much privilege is suspected and verification of the program of the much privilege may be time consuming and costly. Furthermore, (c) an object having needlessly much permission and/or access may be provided in response to a request, and thus a critical damage such as leakage of information or the like may occur.

The following are specific examples of the least privilege violation. (1) A program is executed by a user/group having a certain level of privilege, and permission/access higher than a minimum level of privilege for the user/group based on the specification of the program is granted to the user/group. [Example 1] An access to a target file can be executed by a general user, however, a program is executed by a manager "Administrator", and the manager "Administrator" is unnecessarily granted access to the target file according to the manager "Administrator" level of privilege rather than according to just the necessary general user level of privilege. [Example 2] A shutdown API (Application Program Interface" is not called, however, a program is executed by a user/group having a privilege associated with SE_SHUTDOWN_NAME (e.g., a shutdown privilege), and thus the shutdown API should have been called in response to the program executed by the user group having the privilege. (2) Privilege which is equal to or more than the least privilege required for general privilege (user authority) is requested on the specification of the program. [Example 1] API which refers to a file is merely called, however, authority of writing is requested by API OpenFile( ). [Example 2] A file is not backed up, however, SE_BACKUP_NAME (backup privilege) is requested by API AdjustTokenPrivileges( ). (3) An object having unjust permission and/or access is generated. [Example] an object of NULL DACL (access permission is unset, that is, it is equivalent to a setting state of everyone full control).

Since such problems as described above may occur, it is necessary to create a program so as to avoid the least privilege violation. However, there is a case where a developer gives much privilege (authority) to a program without sufficiently understanding the specification of the access control. Furthermore, there is a case where a developer creates an object having unjust permission and/or access.

A conventional technique for addressing the above-mentioned problems includes a method of detecting a problem by analyzing a source program. However, there are cases where it is difficult and/or impossible to analyze a source program or specifications. Furthermore, it is difficult and/or impossible to detect the least privilege violation corresponding to an execution environment by merely analyzing the source program or the specifications since the source program or specification may depend on an Operating System (OS), security policy, network or the like. Many conventional techniques for access control exist, however, all of these conventional techniques cannot necessarily detect the least privilege violation. Relevant techniques are described in JP-A-2003-186708, JP-A-2007-226495 and JP-A-2008-117026, for example.

SUMMARY

According to an aspect of the invention, a computer-readable storage medium storing a privilege violation detecting program, which when executed by a computer, causes the computer to detect a privilege violation of an test target program, wherein the privilege violation detecting program causes the computer to execute: storing, in an authority request API trace log storing unit, data of each of a plurality of authority request APIs output from the test target program; storing, in an object rule storing unit, rules providing a relationship between the authority request APIs and assumed access APIs, the assumed access APIs being APIs assumed to be called in response to receipt of a related authority request API; storing, in an actual access API trace log storing unit, data relating to actual access APIs, the actual access APIs being access APIs called in response to the authority request APIs; receiving an authority request API from the authority request API trace log storing unit; reading out, from the object access rule storing unit, an assumed access API assumed to be output in response to the received authority request API; determining an actual access API returned in response to the received authority request API from the actual access API trace log storing unit; and storing, into a minimum authority violation data storing unit, data of the received authority request API when the actual access API returned in response received authority request API does not match the read out assumed access API.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram showing an example of the format of an authority request API sampling rule;

FIG. 4 is a diagram showing a specific example of the authority request API sampling rule;

FIG. 5 is a diagram showing an example of the format of an access executing API sampling rule;

FIG. 6 is a diagram showing a specific example of the access executing API sampling rule;

FIG. 7 is a diagram showing an example of the format of an object access rule;

FIG. 8 is a diagram showing a specific example of an object access rule;

FIG. 9 is a diagram showing an example of a privilege access rule;

FIG. 10 is a diagram showing an example of privilege;

FIG. 13 is a diagram showing an example of an test result check screen;

FIG. 14 is a diagram showing an example of an test result display screen;

FIG. 16 is a diagram showing a specific example of an authority request API trace log;

FIG. 17 is a diagram showing a specific example of the access execution API trace log;

FIG. 18C is a diagram showing the processing flow of the least privilege violation determining unit;

FIG. 18D is a diagram showing the processing flow of the least privilege violation determining unit;

FIG. 18E is a diagram showing the processing flow of the least privilege violation determining unit;

FIG. 18F is a diagram showing the processing flow of the least privilege violation determining unit;

FIG. 19 is a diagram showing an example of the structure of an authority request API trace log list;

FIG. 20 is a diagram showing an example of the structure of an actual access API trace log list;

FIG. 21 is a diagram showing an example of the structure of an assumed access API list;

FIG. 22 is a diagram showing an example of the structure of the least privilege violation list.

DESCRIPTION OF EMBODIMENTS

Conventionally, whether the least privilege violation exists cannot be determined without using a source program or a specification.

Accordingly, an object of this invention is to provide a technique of detecting the least privilege violation by executing an test target program. The use of the test target program allows information about the source program to be obtained without reference to the specification of the source program.

Premise and Summary of Embodiments

Figure 1:
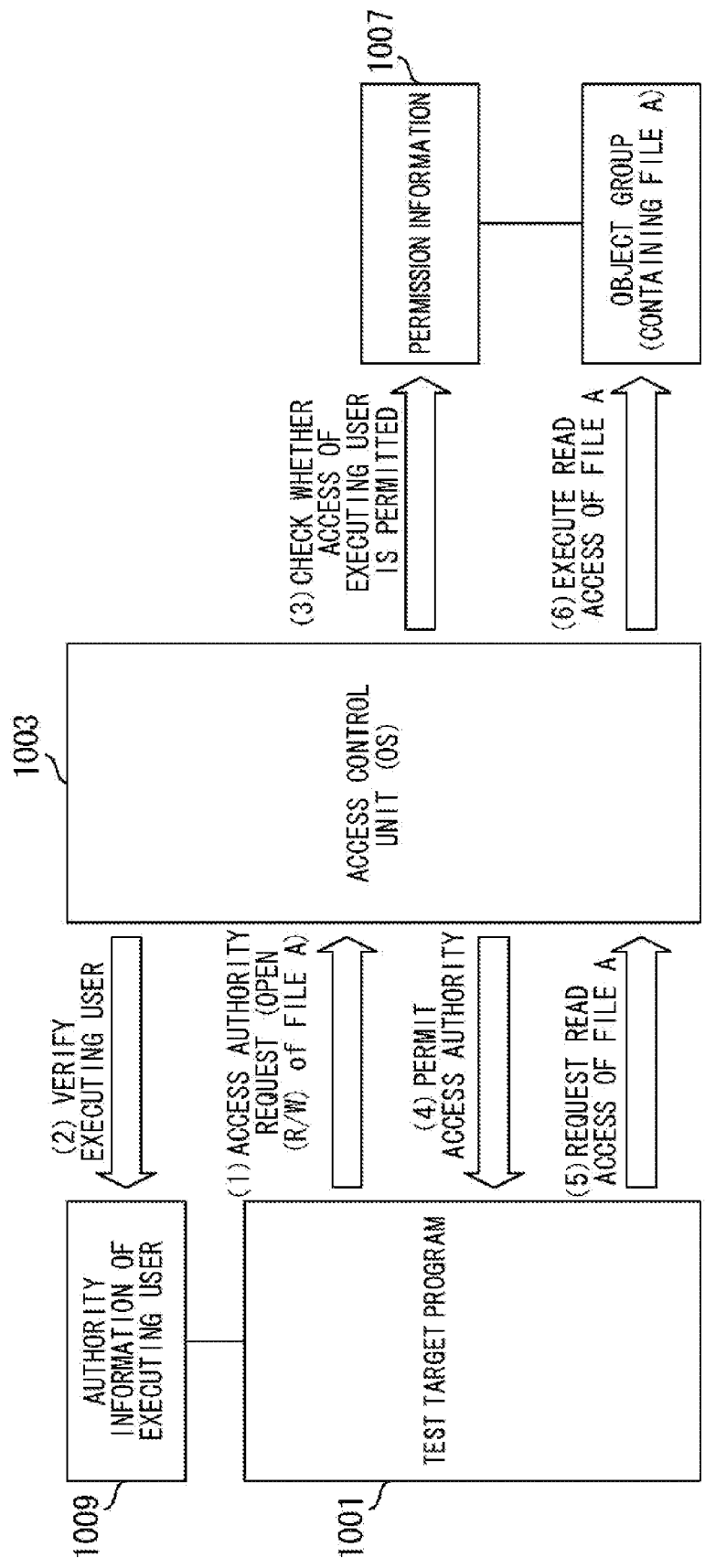
FIG. 1 is a diagram showing the relation between an authority request and an actual access.

FIG. 1 shows a processing content executed when an test target program accesses a file A (FileA) as an object.

First, the test target program 1001 outputs an authority request, which in this example is an open (R/W) (Read and Write) of FileA, to an access control unit 1003 of an OS (step (1)). In response to receiving the authority request, the access control unit 1003 refers to authority information 1009 of an executing user with respect to the test target program 1001 providing the authority request of open (R/W) of FileA. The authority information 1009 is used to check the privilege (authority) of a user who runs the test target program 1001, that is, a user who outputs open (R/W) of FileA (step (2)). Thereafter, the access control unit 1003 refers to permission information 1007 which is preset with respect to FileA, and determines an access of the executing user. In this example, the access control unit 1003 determines whether Read and Write is permitted or not for the FileA (step (3)). Here, when the Read and Write access of the executing user is permitted, the access control unit 1003 returns access permission to the test target program 1001 (step (4)).

In this case, the test target program 1001 requests the Read access of fileA (step (5)). The access control unit 1003 executes the read access of FileA contained in an object group in accordance with the read access of FileA (step (6)).

In this example, only the Read access of FileA is eventually executed, however, the Read and Write access of FileA was initially requested by the test target program 1001. That is, in this example, Open (R/W) of FileA is requested although only Open (R) of FileA is sufficient. Accordingly, it is found that the authority request in this example causes the least privilege violation. Stated differently, it is determined that the least privilege violation has occurred because, initially Open (R/W) was included in authority request, whereas only Open (R) is sufficient.

As described above, if it is checked whether there is any discrepancy between an access assumed on the basis of an authority request and an actual access. The access assumed is the access that should be called according to the authority request, whereas the actual access is the access actually returned in response to a request to access computer resources. Thus, a comparison between the actual access and the assumed access can be used to determine whether the authority request has caused the least privilege violation.

In this embodiment, a call of an authority request API and a call of an actual access API (referred to herein as actual access API) to an object are traced and thus, data of the authority request API and the actual access API is stored. Then, a call of an access API assumed from a trace log of the authority request API (referred to herein as assumed access API) is derived. The assumed access API derived form the trace log of the authority request API is checked to determine whether the call of the assumed access API can be associated with the call of the actual access API. When the assumed access API cannot be properly associated with the actual access API, it is determined that the least privilege violation has occurred.

FIG. 1 shows a case where the least privilege violation is detected because a privilege more than a least privilege needed for accessing the object (i.e., file A) is requested. Other the least privilege violations can be similarly detected based on the teaching of this application.

Specific Content of this Embodiment

Figure 2:
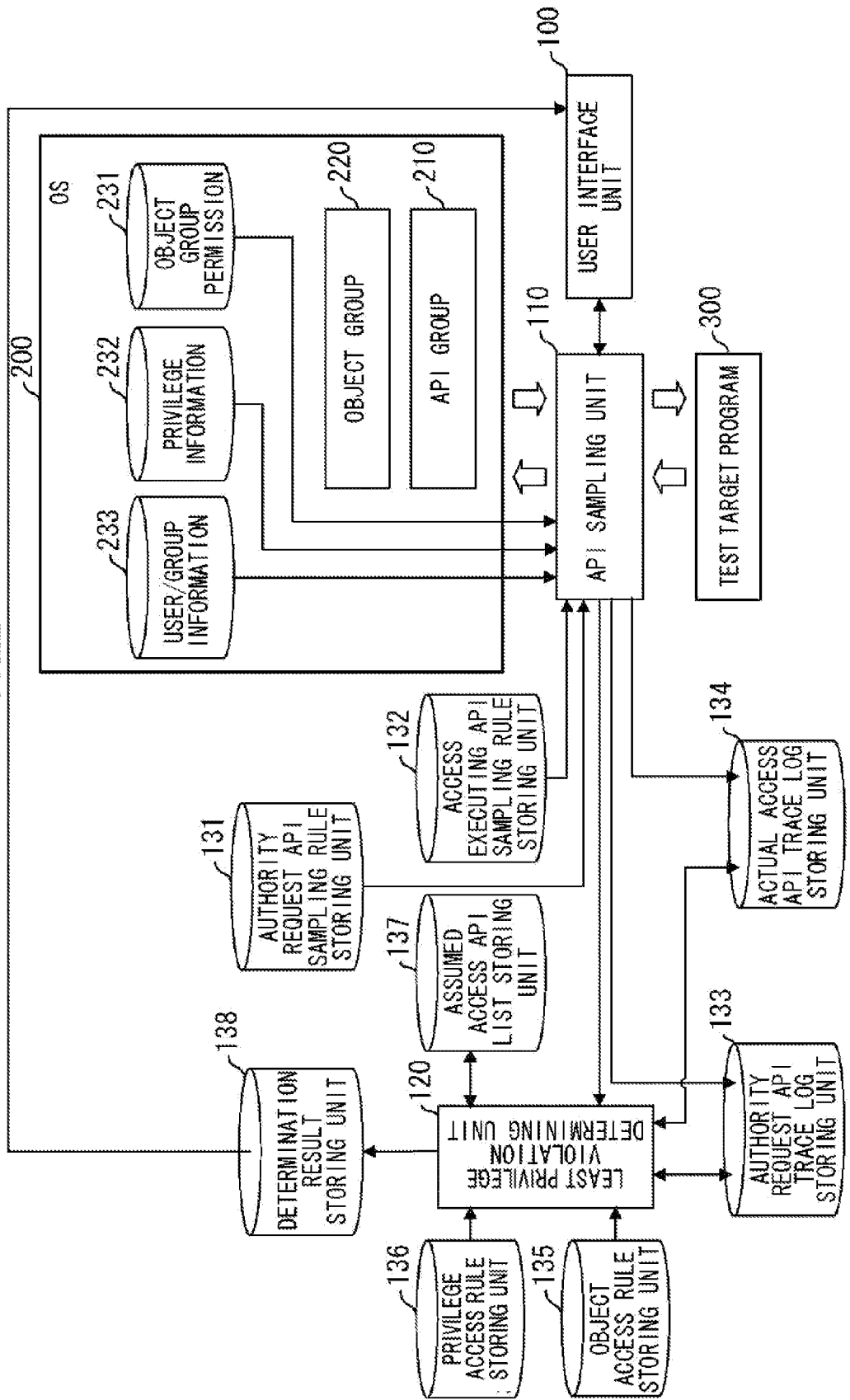
FIG. 2 is a schematic diagram showing a system according to an embodiment of this invention.

FIG. 2 schematically shows the system of this embodiment. An operating system (OS) 200 is the same as prior arts and thus, is well known. OS 200 contains an API group 210, an object group permission 231, a user/group information 233, and privilege information 232. The API group 210 executes processing in response to an API call from various kinds of programs, an object group 220 containing file, directory, pipe, process/thread, access token, registry, service, printer, event, semaphore, mutex, timer, job, etc. The object group permission 231 includes data relating to permission of an object group 220. The user/group information 233 is information of the user/group executing a program. The privilege information 232 is information set in the user/group. The test target program 300 executes an API call on the API group 210 of OS 200 and receives the result thereof.

The computer system for detecting the least privilege violation in this embodiment comprises a user interface unit 100, an API sampling unit 110, an authority request API sampling rule storing unit 131 for storing an authority request API sampling rule for the processing of the API sampling unit 110, an access executing API sampling rule storing unit 132 for storing an access executing API sampling rule for the processing of the API sampling unit 110, an authority request API trace log storing unit 133 for storing an authority request API trace log as a processing result of the API sampling unit 110, an actual access API trace log storing unit 134 for storing an actual access API trace log as a processing result of the API sampling unit 110, an object access rule storing unit 135 for storing an object rule containing the access API corresponding to an authority request API, etc., a privilege access rule storing unit 136 for storing a privilege access rules containing the assumed access API corresponding to a privilege, etc., a least privilege violation determining unit 120, an assumed access API list storing unit 137 for storing an assumed access API list generated by the least privilege violation determining unit 120, and a determination result storing unit 138 for storing a determination result of the minimum authority violation determining unit 120. The least privilege violation determine unit 120 generates data of the assumed access API by using data stored in the authority request API trace log storing unit 133, the actual access API trace log storing unit 134, the object access rule storing unit 135 and the privilege access rule storing unit 136, and determines the least privilege violation.

The user interface unit 100 accepts a user's indication of the test target program 300, and instructs the API sampling unit 110. The API sampling unit 110 traces the API call of OS 200 based on instructions from the test target program 300, and instructs the least privilege violation determining unit 120 to execute processing when the trace is finished. Furthermore, the user interface unit 100 reads out the data of the determination result stored in the determination result storing unit 138, and presents the data to the user.

FIG. 3 shows an example of the format of the authority request API sampling rule stored in the authority request API sampling rule storing unit 131. As shown in FIG. 3, this rule contains a portion in which request authority names of sampling target APIs, that is, API names are listed, and a portion in which data items to be recorded for the respective authority request APIs are listed. The data items to be recorded contain a trace number (TraceNO) as a serial number representing the detection order of each detected authority request API, an API name (API), an argument (Parameters), an own process ID (OwnProcessID) as the process ID of a calling source, a thread ID (OwnThreadID) as ID of the thread of a calling source, an API call date and time (Time) at which this API call is executed, an executing account (UserAccount) of a user who runs the test target program 300, a group to which the executing user belongs (Group), a privilege of the executing user (Privilege), a path of an access target object (ObjectPath), and permission of an object (ObjectPermission). The API name (API), the argument (Parameter), the own process ID (OwnProcessID), the thread ID (OwnThreadID) and the access target object path (ObjectPath) are obtained from the call of the authority request API itself. The API call date and time (Time) is obtained from the time-counting of the OS 200. The executing account (UserAccount) and the group to which the executing user belongs (Group) are obtained from the user/group information 233. The privilege (Privilege) is obtained from the privilege information 232. The permission of the object (ObjectPermission) is obtained from the object group permission 231.

FIG. 4 shows a specific example of the authority request API sampling rule. In this case, four authority request APIs are listed. In the following description, "errno_t_sopen_s (int*pfh, const char*filename, int of lag. int shflag, int pmode)" on a first line which is an request API for requesting open of an easily-comprehensive file will be mainly described.

FIG. 5 shows an example of the format of the access executing API sampling rule stored in the access executing API sampling rule storing unit 132. As shown in FIG. 5, this rule contains a portion in which names of sampling target APIs (object access names) are listed, and a portion in which data items to be recorded with respect to each object access.

The data items to be recorded contains a trace number (TraceNO) as a serial number representing the detection order of the detected authority request API, an API name (API), an argument (Parameters), a parent process ID (ParentProcess ID) as ID of a parent process of a call source process, an own process ID (OwnProcess ID) as a process ID of a call source, a thread ID (OwnThreadID) as ID of the thread of a call source, an API calling date and time (Time) as a date and time at which this API call is executed, an executing account of a user who runs the test target program 300 at present (UserAccount), a group to which an executing user belongs (Group), a privilege (Privilege) of the executing user, a path of an access target object (ObjectPath), and object permission (ObjectPermission). The API name (API), the argument (Parameters), the parent process ID (Parent Process ID), the own process ID (OwnProcess ID), the thread ID (OwnThread ID), and the access target object path (Access Target Object Path) are obtained from the call of the authority request API itself. The API call date and time (Time) is obtained from the time-counting of OS 200. The executing account (UserAccount) and the group to which the executing user belongs (Group) are obtained from the user/group information 233. The privilege (Privilege) is obtained from the privilege information 232. The permission of the object (ObjectPermission) is obtained from the object group permission 231.

FIG. 6 shows a specific example of the access executing API sampling rule. In this case, six access APIs are listed. Access API "int_read(int fd, void*buffer, unsigned int count)" or "int_write(int fd, const void*buffer, unsigned int count)" is output in response to the authority request API "errno_t_sopen_s(int*pfh, const char*filename, int oflag, int shflag, int pmode)".

FIG. 7 shows an example of the format of the object access rule stored in the object access rule storing unit 135. In the example of FIG. 7, each line represents one object access rule. One object access rule contains a request authority name serving as a search key, an additional search condition used to determine whether this rule should be applied or not, a matching condition a for the request authority name which serves as a condition to associate the assumed access API with the actual access API, an object access name extracted as an assumed access API, and a matching condition b for the actual access API which serves as a condition to associate the assumed access API with the actual access API.

FIG. 8 shows a specific example of the object access rule. In the example of FIG. 8, four rules are shown. First and second lines are rules for the same authority request API "errno_t_sopen_s(int*pfh, const char*filename, int oflag, int shflag, int pmode)". However, the additional search condition is different therebetween. That is, on the first line, an addition search condition indicating only READ as described by oflag=_0_RDONLY is set. On the second line, an additional search condition indicating both Read and Write as described by oflag=_0_RDWR. The matching condition a for the authority request API is "Parameters. pfh=*" on both the first and second lines. On the first line, the assumed access API corresponding to the authority request API is set to "int_read (int fd. void *buffer, unsigned int count)" representing Read. On the second line, the assumed access API corresponding to the authority request API is set to "int_write(int fd. const void *buffer, unsigned int count)" representing Write. On the second line, the assumed access API as Read may be sufficient for the authority request API. However, in the case of Read, the authority request API on the first line is also sufficient. Therefore, the assumed access API concerning Write is associated. With respect to the other rules, there is a case where the additional search condition is not set. A method of using the matching conditions a and b will be described together with the description of the processing flow.

FIG. 9 shows an example of the privilege access rule stored in the privilege access rule storing unit 136. In the example of FIG. 9, the assumed access APIs corresponding to respective privileges (authorities) are listed.

There are privileges shown in FIG. 10, for example. The executing user may be provided with plural privileges. In this case, plural corresponding assumed access APIs are extracted in FIG. 9.

Next, the processing content of the system shown in FIG. 2 will be described with reference to FIGS. 11 to 22. First, the processing content of the user interface unit 100 will be described.

The user interface unit 100 displays a main menu on the display device (S1). In this embodiment, for example, any one of an indication of an test target program, check of an test result and end of processing may be selected. Accordingly, the user interface unit 100 promotes the user to select a menu item. The user selects the menu item, and the user interface unit 100 accepts a selecting instruction from the user (S3). Here, the user interface unit 100 determines whether the selecting instruction from the user is an indication of the test target (S5). When the selecting instruction is not an indication of the test target, the user interface unit 100 shifts to the processing of FIG. 11B as indicated by branch A of the flowchart.

Figure 12:
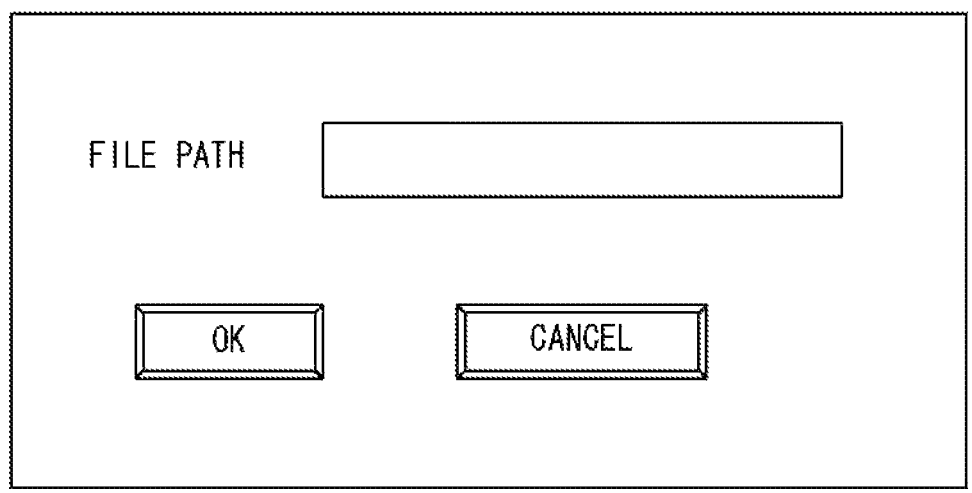
FIG. 12 is a diagram showing an example of an indicating screen of an test target program.

On the other hand, when the selecting instruction is the indication of the test target, the user interface unit 100 displays an test target program indicating screen on the display device (S7). For example, the user interface unit 100 displays a screen as shown in FIG. 12. That is, an input of the file path of the test target program is displayed along with an OK button and a cancel button. Further, the user interface unit 100 may present the directory of the file system and promote the selection of a file, for example.

The user inputs the file path of the test target program on the test target program indicating screen, and clicks the OK button. At this time, the user interface unit 100 accepts the input of the file path of the test target program (S9). The user interface unit 100 checks whether the API sampling unit 110 has been started or not (S11). When the API sampling unit 110 is not started, the user interface unit 100 starts the API sampling unit 110 (S13). On the other hand, when the API sampling unit 110 has been started, the user interface unit 100 shifts to S15.

Thereafter, the user interface unit 100 outputs the file name of the indicated test target program to the API sampling unit 110, and instructs start of the processing (S15). Then, it returns to the S1.

Figure 11A:
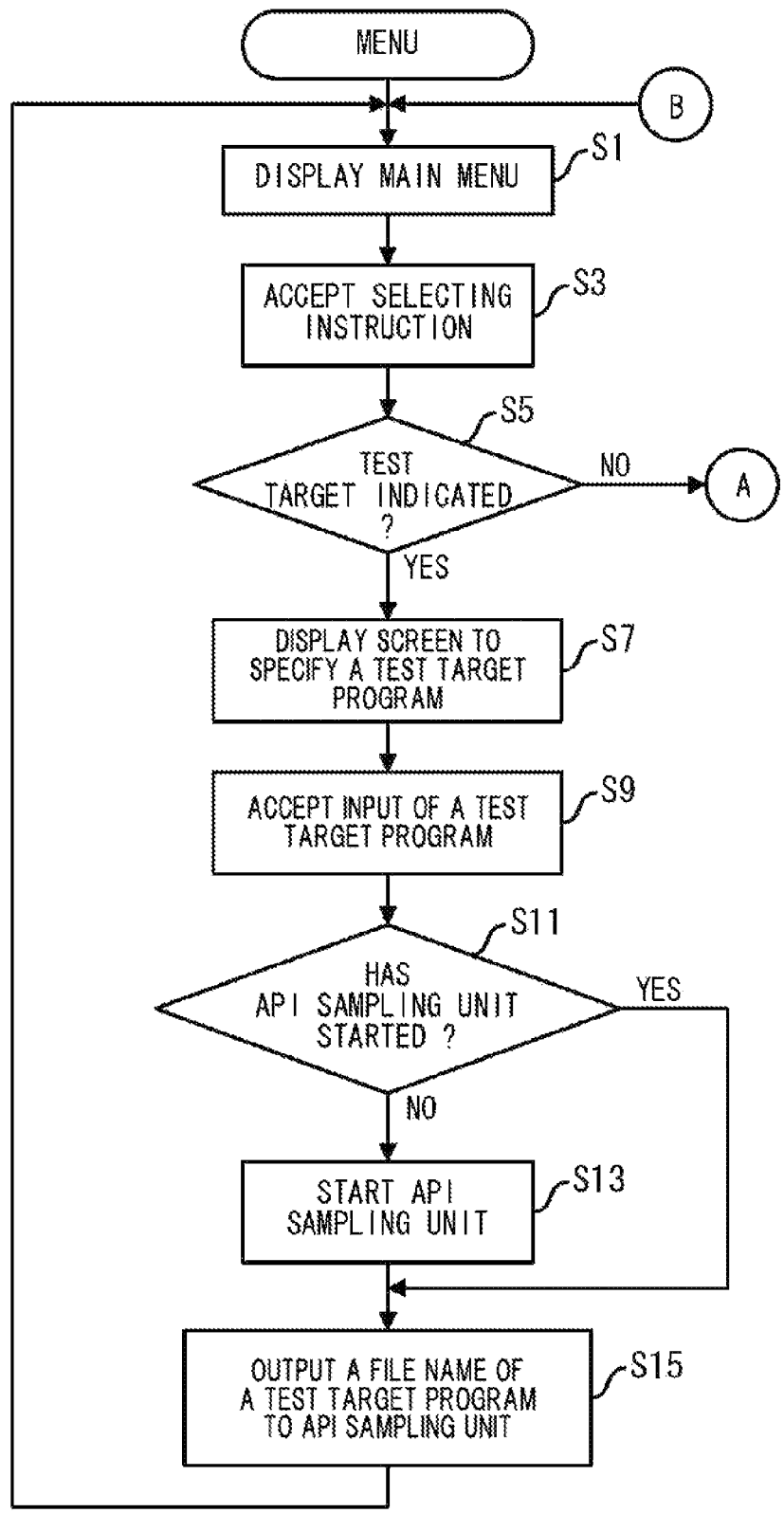
FIG. 11A is a diagram showing the processing flow of a user interface unit.
Figure 11B:
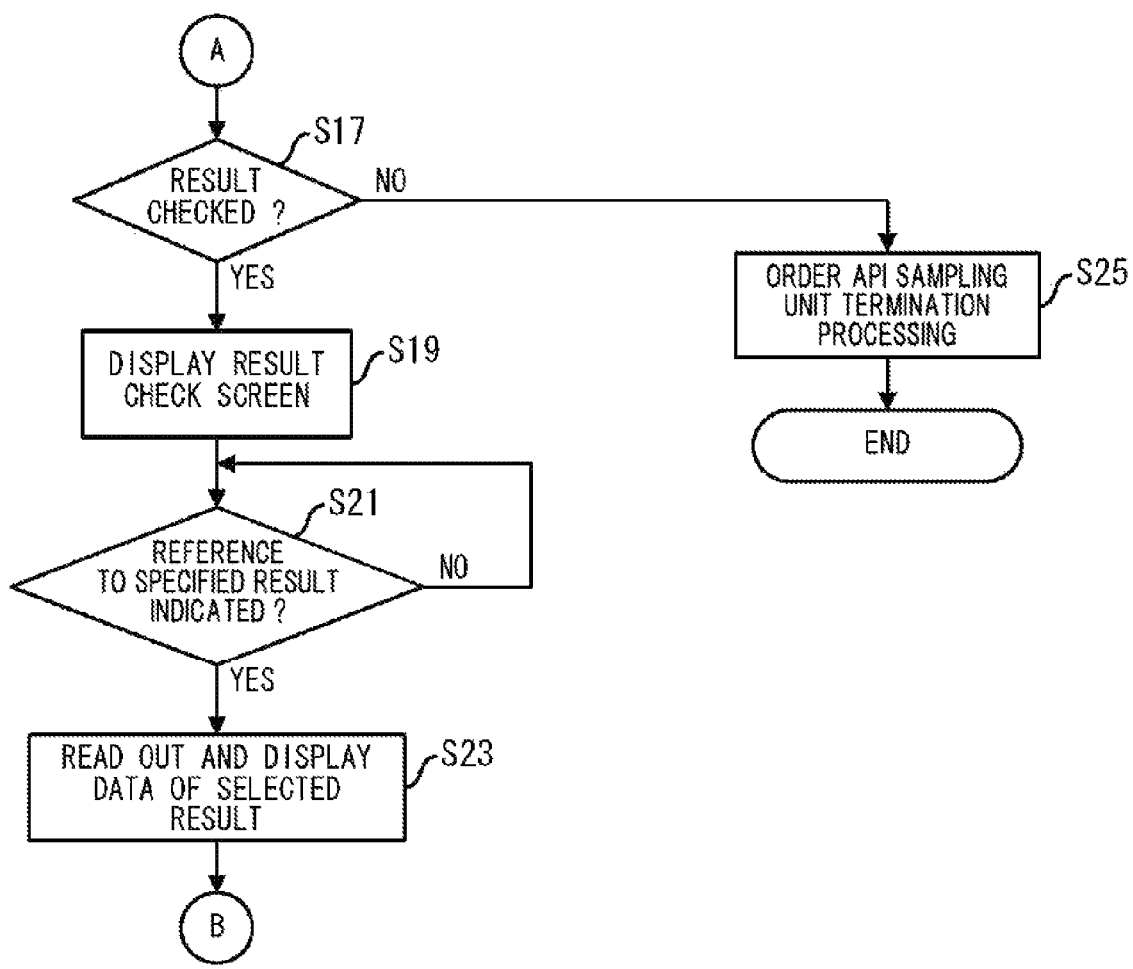
FIG. 11B is a diagram showing the processing flow of the user interface unit.

Returning to the processing of FIG. 11B, when the menu item selected on the main menu is not the indication of the test target, the user interface unit 100 determines whether the test result check is selected or not (S17). When the test result check is selected, the user interface unit 100 generates result check screen data containing the item of the determination result stored in the determination result storing unit 138, and displays the result check screen data on the display device (S19). For example, the user interface unit 100 displays a screen as shown in FIG. 13. In the example of FIG. 13, three determination results (in this case, three test target programs) are listed. PID is a program ID, and a user name represents the authority of a user who runs the test target program. The user may select a determination result illustrated in FIG. 13 by clicking on the text identifying the determination result. That is, the user may input a reference instruction.

The user interface unit 100 determines whether a reference instruction referring to a special determination result is made or not (S21). The user interface unit 100 repeats the S21 until a reference instruction is made. When the reference instruction to the special determination result is accepted, the user interface unit 100 reads out the data of the selected determination result from the determination result storing unit 138, generates display data and displays the display data on the display device (S23). For example, a screen as shown in FIG. 14 is displayed. In the example of FIG. 14, the program name of the test target program, PID as the program ID, the user name of a user who runs the test target program, the group name of a group to which the user belongs, starting date and time and ending date and time, a total estimation (whether there is least privilege violation or not), the number of least privilege violations (ERR), and the specific content of the least privilege violations are displayed. The specific content of the least privilege violation is obtained from the data generated by the least privilege violation determining unit 120 described below. The specific content of this data will be described below.

The user interface unit 100 returns to S1 through branch B. When the end of the processing is instructed in S17, rather than the result check, the user interface unit 100 instructs the API sampling unit to finish the processing, and finishes its own processing (S25).

By executing the above processing, the user interface unit 100 requests the user to select the test target program, and present the user with information regarding the least privilege violation determination result.

Figure 15:
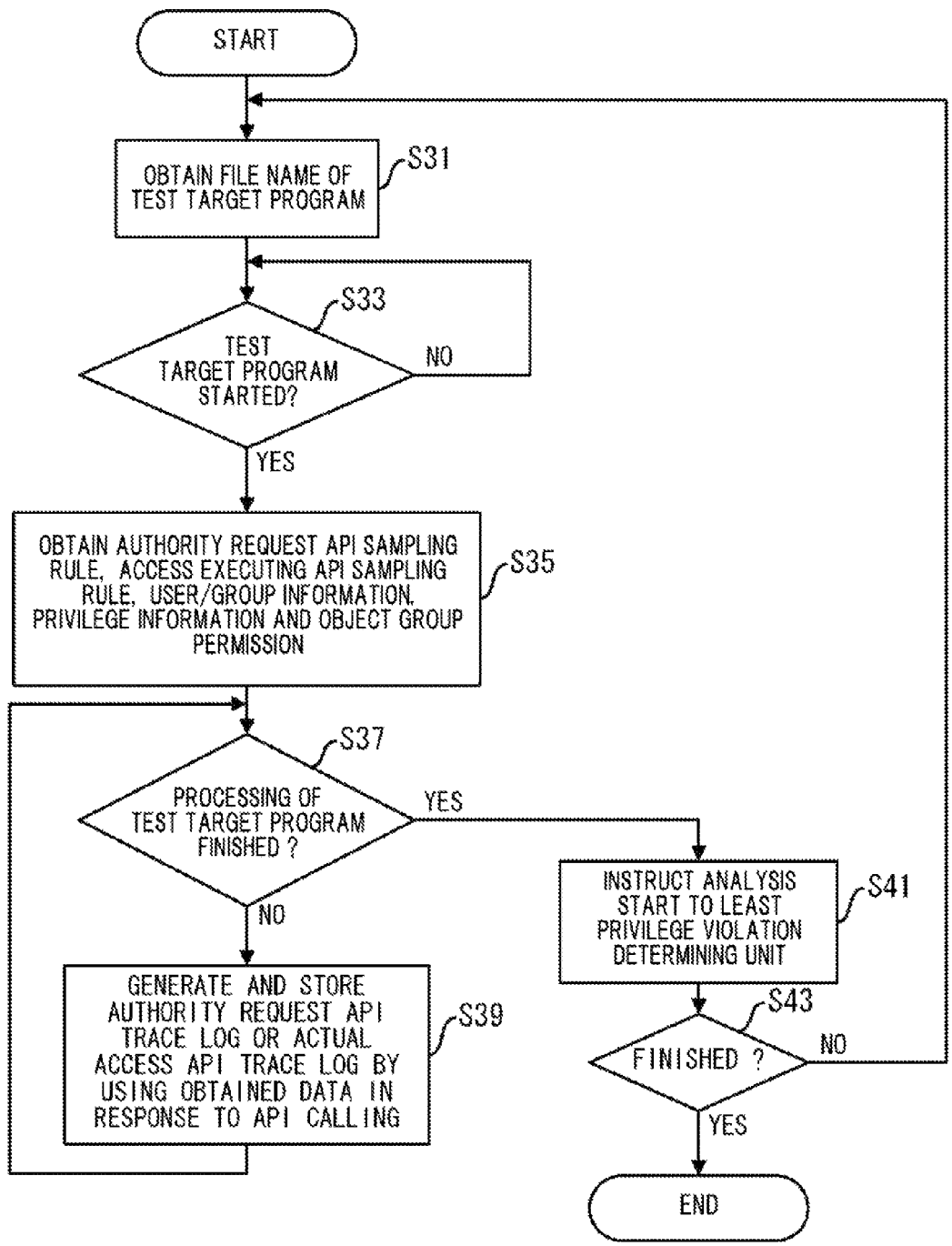
FIG. 15 is a diagram showing the processing flow of an API sampling unit.

Next, the processing content of the API sampling unit 110 which is instructed to start the processing in S15 will be described with reference to FIGS. 15 to 17. The API sampling unit 110 obtains the file name of the test target program 300 from the user interface unit 100 (S31). The API sampling unit 110 checks whether the test target program 300 is executing or not (S33). When the test target program 300 is not executing, the API sampling unit 110 stands by until the test target program 300 executes or the API sampling unit 110 forcedly executes the test target program 300.

When the test target program 300 executes, the API sampling unit 110 obtains the authority request API sampling rule from the authority request API sampling rule storing unit 131. Furthermore, the API sampling unit 110 obtains the access executing API sampling rule, the user/group information 233, the privilege information 232 and the object group permission 231 from access executing API sampling rule storing unit 132

(S35). Accordingly, the API sampling unit 110 extracts an API call for which a trace log should be generated, from API calls which the test target program 300 outputs. Furthermore, the API sampling unit 110 can obtain the data of data items to be recorded in the trace log for the API call.

The API sampling unit 110 checks whether the processing of the test target program 300 is finished or not (S37). When the processing is not finished, the API sampling unit 110 generates the authority request API trace log or the executing access API trace log by using the data obtained in S35 in response to the API call from the test target program 300, and stores the data into the authority request API trace log storing unit 133 or the executing access API trace log storing unit 134 (S39). Then, the API sampling unit 110 returns to the S37.

For example, when there is a call associated with an authority request API, the API sampling unit 110 checks whether the received authority request API listed in [TargetAPIs] of FIG. 4. When it is one of the listed APIs, the API sampling unit 110 obtains the data items listed in [TraceData], and stores the data item concerned into the authority request API trace log storing unit 133. The API sampling unit 110 may obtain the data items by serially providing a number in the detection order with respect to the trace number (TraceNO). For example, data as shown in FIG. 16 are stored in the authority request API trace log storing unit 133. The trace log of the trace number "001" is data registered according to the sampling rule of the first line of FIG. 4. The trace log of the trace number "002" is data registered according to the sampling rule of the third line of FIG. 4. The trace log of the trace number "003" is data registered according to the sampling rule of the fourth line of FIG. 4.

When there is a call of access API, the API sampling unit 110 checks whether the access API is an API listed in [TargetAPIs] of FIG. 6. When the access API is one of the listed APIs, the API sampling unit 110 obtains the data items listed in [TraceData], and stores the data items into the actual access API trace log storing unit 134. The API sampling unit 110 obtains the data items by serially providing a number in the detection order with respect to the trace number (TraceNO). For example, data as shown in FIG. 17 are stored in the actual access API trace log storing unit 134. The trace log of the trace number "001" is data registered according to the sampling rule of the second line of FIG. 6. The trace log of the trace number "002" is data registered according to the sampling rule of the fifth line of FIG. 6. The trace log of the trace number "003" is data registered according to the sampling rule of the sixth line of FIG. 6.

When the processing of the test target program 300 is finished in S37, the API sampling unit 110 instructs the least privilege violation determining unit 120 to start analysis (S41). The processing of the least privilege violation determining unit 120 will be described hereunder in detail. When the end of the processing of the API sampling unit 110 is not instructed, the API sampling unit 110 returns to the S31. When the end of the processing is instructed, the API sampling unit 110 finishes the processing.

As described above, the trace logs concerning APIs output during execution of the test target program 300 are accumulated in the authority request API trace log storing unit 133 and the actual access API trace log storing unit 134. That is, necessary data are collected without analyzing the source program or the specification of the test target program 300. Accordingly, the test can be performed even when the source program and the specification do not exist or are unavailable. As such, cumbersome manual analysis of the source program and the specification is unnecessary, and thus a working load of a system according to an example embodiment may be reduced.

Next, the processing content of the least privilege violation determining unit 120 will be described with reference to FIGS. 18 to 22.

First, the least privilege violation determining unit 120 reads out the object access rule from the object access rule storing unit 135 (S51). Furthermore, the least privilege violation determining unit 120 reads out the privilege access rule from the privilege access rule storing unit 136 (S53). Furthermore, the least privilege violation determining unit 120 reads out the authority request API trace log from the authority request API trace log storing unit 133, generates the authority request API trace log list and stores the generated authority request API trace log list into a storage device such as a main memory or the like (S55), for example. The least privilege violation determining unit 120 generates list structure data which has a list as shown in FIG. 19 for every trace log. In the list shown in FIG. 19, data from "TraceNO" to "ObjectPermission" are data contained in the trace log. A Null pointer is registered as a pointer to the assumed access API until an address is registered in the following processing. There is a case where plural actual access API trace log lists are associated with the authority request API, and thus a pointer to a pointer list to an actual access API trace log/record is registered. When no actual access API trace log list to be associated exists, the Null pointer is registered. With respect to a pointer to the next authority request API list, when there is no next authority request API list, that is, in the case of the last authority request API list, the Null pointer is registered.

Furthermore, the least privilege violation determining unit 120 reads out the actual access API trace log from the actual access API trace log storing unit 134, generates the actual access API trace log list and stores the actual access API trace log list into a storage device such as a main memory or the like (S57), for example. The least privilege violation determining unit 120 generates list structure data which has a list as shown in FIG. 20 for every trace log. In the list shown in FIG. 20, data from "TraceNO" to "ObjectPermission" are data contained in the trace log. With respect to a pointer to the next actual access API trace log list, when a next actual access API trace log list does not exist, that is, in the case of the last actual access API list, the Null pointer is registered.

Next, the least privilege violation determining unit 120 reads the head list from the authority request API trace log list (S59). Furthermore, the least privilege violation determining unit 120 initializes a counter called as AccessGroup to "1" (S61).

The least privilege violation determining unit 120 determines whether the authority request API trace log can be read out (S63). When the authority request API trace log cannot be read out, the least privilege violation determining unit 120 shifts to the processing of FIG. 18C through branch C of the flow chart. On the other hand, when the authority request API trace log can be read out, the minimum authority violation determining unit 120 shifts to the processing of FIG. 18B through branch D.

Next, the processing of when the authority request API trace log list can be read out will be described with reference to FIGS. 18B and 21.

First, the least privilege violation determining unit 120 searches object access rules by using the authority request API name of the read-out authority request API trace log list as a search key, and specifies an object access rule satisfying an additional search condition from the corresponding object access rules (S65). In the case of an object access rule as shown in FIG. 8, if the authority request API name contained in the authority request API trace log list is "errno_t_sopen_s (int* pfh, const char *filename, int oflag, int shflag, int pmode)", the first and second lines are specified. In such a case, the least privilege violation determining unit 120 determines which one of "oflag=_0_RDONLY" and "oflag=_0_RDWR" defined as the additional search condition in the specified object access rule corresponds to the present authority request API trace log list, and the corresponding object access rule is used.

Subsequently, the least privilege violation determining unit 120 specifies an assumed access API and the matching conditions a and b corresponding to the specified object access rule (S67). When the first line of FIG. 8 is specified, the least privilege violation determining unit 120 specifies the matching condition a for the assumed access API name "int_read (int fd, void *buffer, unsigned int count)" and the authority request API as "Parmeters.pfh=*" and the matching condition b for the actual access API as "Parameters.fd=*".

Furthermore, the least privilege violation determining unit 120 adds a pointer to the list in which the assumed access API is registered to the authority request API trace log list (S69). That is, the least privilege violation determining unit 120 registers into "pointer to assumed access API" of FIG. 19 the pointer to the list in which the assumed access API is registered. Furthermore, the least privilege violation determining unit 120 registers, in the assumed access API list, the pointer to the authority request API trace log list, the assumed access API, the necessary data in the authority request API trace log list, and the matching conditions a and b specified in S67 (S71). For example, an assumed access API list as shown in FIG. 21 is generated for every assumed access API. In the example of FIG. 21, "API" represents the assumed access API name, "Parameter", "UserAccount", "Group", "Privilege", "ObjectPath" and "ObjectPermission" represent the corresponding data in the authority request API trace log list, "matching condition a" and "matching condition b" represent the matching conditions a and b specified in S67, and "pointer to authority request API" represents the pointer to the authority request API trace log list. With respect to "AccessGroup", Null is set in this step. The pointer to the pointer list to the actual access API trace log is set in the following processing, and thus in this case, it is the Null pointer. Furthermore, the address of the next generated assumed access API list is set in the pointer to the next assumed access API list.

As described above, the least privilege violation determining unit 120 generates one assumed access API list for every authority request API trace log, and searches for a relationship with the actual access API trace log in processing described below. The least privilege violation determining unit 120 stores the assumed access API list into the assumed access API list storing unit 137.

The least privilege violation determining unit 120 determines whether the privilege of the authority request API trace log varies from a previous authority request API trace log (S73). When plural privileges are provided, the least privilege violation determining unit 120 determines the variations in this step when at least one privilege varies. When no variation occurs in the privilege, the least privilege violation determining unit 120 shifts to S81. On the other hand, when variation occurs in the privilege, the least privilege violation determining unit 120 specifies the assumed access API corresponding to the privilege with respect to the authority request API from the privilege access rule (S75). The least privilege violation determining unit 120 searches the privilege access rule of FIG. 9 on the basis of the privilege, and specifies the corresponding assumed access API. When plural privileges are set, the least privilege violation determining unit 120 specifies plural assumed access APIs.

The least privilege violation determining unit 120 registers the assumed access API specified in S75, the data in the authority request API trace log list, AccessGroup and the pointer to the authority request API trace log list (S77). The least privilege violation determining unit 120 registers the data according to the list structure shown in FIG. 21. In the example of FIG. 21, "API" represents the assumed access API name, "Parameter", "UserAccount", "Group", "Privilege", "ObjectPath" and "ObjectPermission" represent corresponding data in the authority request API trace log list, "matching condition a" and "matching condition b" are Null, and "pointer to authority request API" represents the pointer to the authority request API trace log list. With respect to "AccessGroup", the numerical value of present AccessGroup is set. The pointer to the pointer list to the actual access API trace log is set in the following processing. In this case, it is set to a Null pointer. Furthermore, the address of the next generated assumed access API list is set in the pointer to the next assumed access API list. An assumed access API list for determining whether unnecessary privilege is set or not is generated by executing the processing as described above.

Thereafter, the least privilege violation determining unit 120 increments AccessGroup by one (S79). Thereafter, the least privilege violation determining unit 120 shifts to S81.

When the privilege does not vary in S73 or after the S79, the least privilege violation determining unit 120 reads out the next list of the authority request API trace log (S81). Thereafter, the least privilege violation determining unit 120 returns to the S63 through a terminal E.

An assumed access API list for checking whether a least privilege violation indicating that an unnecessary authority request is made or an unnecessary privilege is provided occurs is generated by executing the processing described above.

Figure 18A:
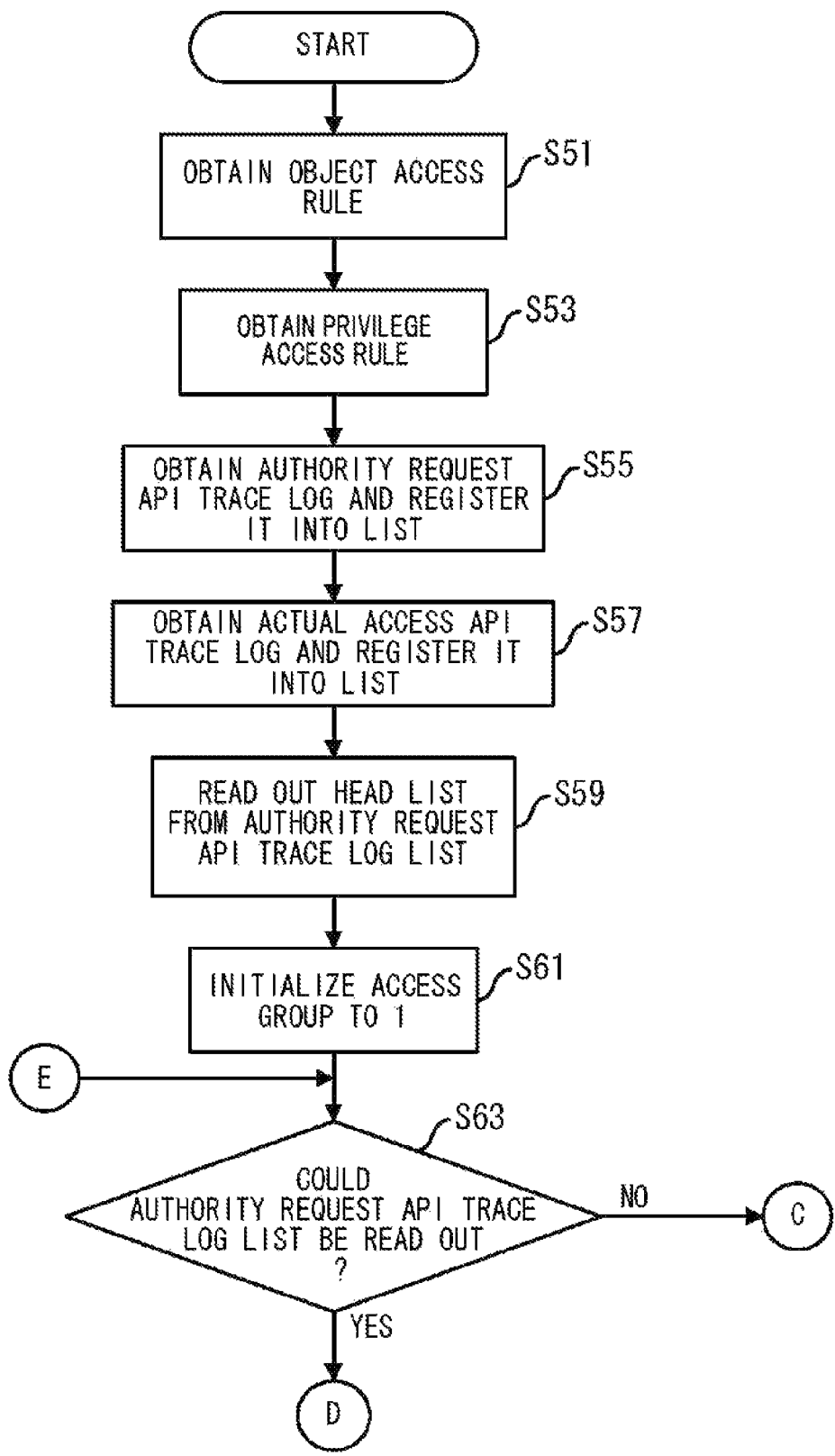
FIG. 18A is a diagram showing the processing flow of the least privilege violation determining unit.
Figure 18B:
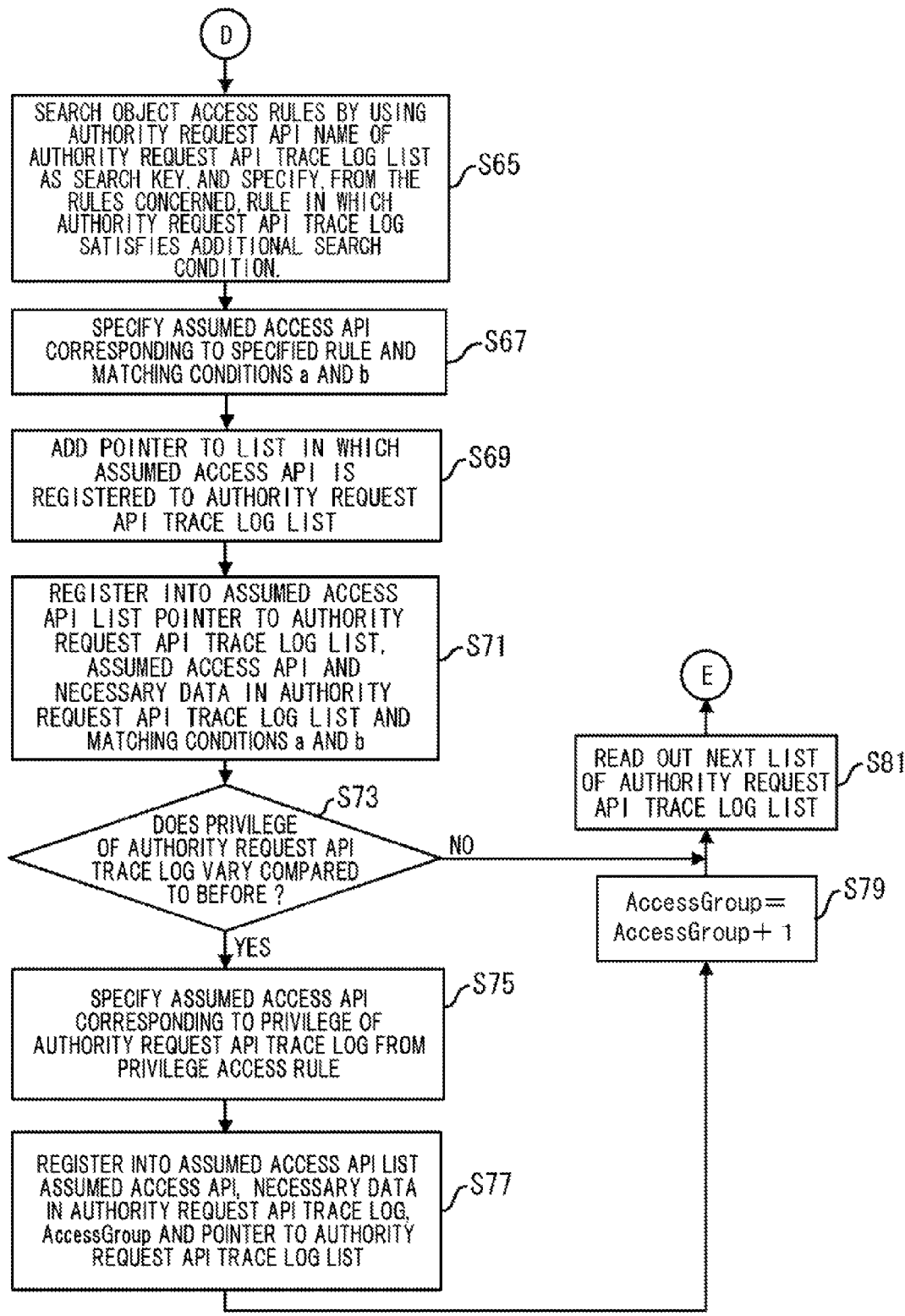
FIG. 18B is a diagram showing the processing flow of the least privilege violation determining unit.

Shifting to the description of the processing of FIG. 18C, the least privilege violation determining unit 120 reads out the first list of the actual access API trace log (S83). The least privilege violation determining unit 120 determines whether the actual access API trace log can be read out (S85). When the actual access API trace log list cannot be read out, the least privilege violation determining unit 120 shifts to the processing of FIG. 18E through branch F of the flow chart. When the actual access API trace log list can be read out, the least privilege violation determining unit 120 reads out the head list of the assumed access API list (S87). Furthermore, the least privilege violation determining unit 120 determines whether the assumed access API list can be read out (S89). When the assumed access API list cannot be read out, the least privilege violation determining unit 120 shifts to S95 through branch G of the flow chart. At this time, the least privilege violation determining unit 120 reads out the next list in the actual access API trace log list (S95). Then, the minimum authority violation determining unit 120 shifts to S85.

When it is determined in S89 that the assumed access API list can be read out, the least privilege violation determining unit 120 determines whether the API name and the access target object path of the read-out assumed access API are equal to the API name and the access target object path of the actual access API trace log (S91). This is a first condition for associating the assumed access API and the actual access API with each other. When this condition is not satisfied, the least privilege violation determining unit 120 shifts to S105 of FIG. 18D through branch I of the flow chart. When this condition is satisfied, the least privilege violation determining unit 120 determines whether the call date and time of the actual access API trace log is subsequent to the call date and time of the authority request API as the origin of the assumed access API and also the matching condition a of the authority request API specified with respect to the assumed access API is coincident with the matching condition b of the actual access API trace log (S93). This is a second condition for associating the assumed access API and the actual access API with each other.

There is no case where the call date and time of the actual access API trace log precedes the call date and time of the corresponding authority request API. Accordingly, this condition is set at a former half portion of the second condition. However, the least privilege violation determining unit 120 may check whether the time is within a fixed time period following the call date and time of the authority request API.

Furthermore, the matching condition a specified as described above is "Parameters.pfh=*", and the matching condition b is "Parameters.fd=*". In this case, the value of pfh in Parameter of the trace log list of the authority request API as the origin of the assumed access API is specified as the matching condition a. The value of fd in the Parameter of the actual access API list is specified as the matching condition b. It is determined whether the value of pfh and the value of fd are coincident with each other.

When the second condition described above is not satisfied, the least privilege violation determining unit 120 shifts to S105 of FIG. 18D through branch I. On the other hand, when the second condition is satisfied, the least privilege violation determining unit 120 shifts to S97 of FIG. 18D through branch H of the flow chart.

Shifting to the description of the processing of FIG. 18D, the least privilege violation determining unit 120 adds the pointer to the actual access API trace log list to the pointer list (S97). Furthermore, the least privilege violation determining unit 120 adds the pointer to the actual access API trace log list to the authority request API trace log list as the origin of the corresponding list of the assumed access API, specifically, the pointer list to the actual access API trace log (S99). Through the setting of the pointer as described above, the pointer is registered as data that the assumed access API relating to the authority request API trace log is associated with the actual access API trace log.

Thereafter, the least privilege violation determining unit 120 determines whether all of UserAccount, Group, Privilege, ObjectPath and ObjectPermission are equal between the actual access API trace log and the assumed access API (S101). Even when the assumed access API and the actual access API trace log are associated with each other, a discrepancy may exist between the priority request and the actual access if such a condition is not satisfied. Accordingly, the least privilege violation determining unit 120 registers the data of the actual access API trace log list into the least privilege violation list (S103).

FIG. 22 shows an example of the least privilege violation list. FIG. 22 shows the least privilege violation list concerning one actual access API trace log list. With respect to the data from "API" to "ObjectPermission", data of the actual access API trace log list are copied. The address of the next least privilege violation list is registered in "pointer to next least privilege violation list". However, in the last case, the Null pointer is registered. The least privilege violation determining unit 120 shifts to S105 after the S103.

When the condition of the S101 is satisfied or after the S103, the least privilege violation determining unit 120 reads out the next list in the assumed access API list (S105). The least privilege violation determining unit 120 returns to the S89 through branch J of the flow chart.

Shifting to the description of the processing of FIG. 18E, the least privilege violation determining unit 120 reads out the head list of the authority request API trace log list (S107). Then, the least privilege violation determining unit 120 determines whether the authority request API trace log list can be read out (S109). When the authority request API trace log list cannot be read out, the least privilege violation determining unit 120 shifts to the processing of FIG. 18F through branch K of the flow chart. On the other hand, when the priority request API trace log list can be read out, the least privilege violation determining unit 120 determines whether the authority request API trace log list contains the pointer to the actual access API trace log list (S111). That is, the least privilege violation determining unit 120 determines whether the actual access API trace log corresponding to the authority request API trace log exists. When this condition is satisfied, the proper authority request API call is made, and thus the least privilege violation determining unit 120 shifts to the S115. On the other hand, when this condition is not satisfied, the authority request API call is made without following any actual access, and thus the least privilege violation determining unit 120 registers the data of the authority request API trace log list into the least privilege violation list (S113).

The least privilege violation determining unit 120 reads out the next list in the authority request API trace log list (S115). Then, the least privilege violation determining unit 120 returns to the S109.

Shifting to the description of the processing of FIG. 18F, the least privilege violation determining unit 120 reads out the head list of the assumed access API list (S117). The least privilege violation determining unit 120 determines whether the assumed access API list can be read out (S119). When the assumed access API list can be read out, the least privilege violation determining unit 120 reads out the assumed access API list concerning the same AccessGroup as AccessGroup of the assumed access API list relating to the processing from the overall assumed access API list (S121). The assumed access API list containing AccessGroup is set only in S77, and thus the assumed access API list generated at the same timing is extracted. With respect to the other assumed access API lists, one assumed access API list is specified.

The least privilege violation determining unit 120 determines whether there is an assumed access API list out of the assumed access API lists concerning the same AccessGroup, in which the pointer to the actual access API trace log list, i.e., the pointer to the pointer list to the actual access API trace log is registered (S123). When this condition is satisfied, that is, when the assumed access API list and the actual access API trace log list are associated with each other, a proper assumed access API list is generated. Therefore, in this case, the least privilege violation determining unit 120 shifts to S127. On the other hand, when the above condition is not satisfied, that is, when the assumed access API list and the actual access API trace log list are not associated with each other, the least privilege violation determining unit 120 registers the data of the authority request API trace log list as the origin of this assumed access API list into the least privilege violation list (S125).

When it is determined after the S125 or in S123 that the condition is satisfied, the least privilege violation determining unit 120 reads out the next list in the assumed access API list (S127). Then, the least privilege violation determining unit 120 returns to the S119.

As described above, the determination as to whether there is a least privilege violation or not is executed at two stages through the processing flow of FIG. 18E and the processing flow of FIG. 18F. The processing flow of FIG. 18F is responsive to the variation of the privilege, and is the processing relating to the assumed access API list generated in connection with AccessGroup. Basically, the controversial priority request API trace log can be extracted by only the processing flow of FIG. 18F.

When it is determined in S119 that all the assumed access API lists are processed, the least privilege violation determining unit 120 counts the list number of the least privilege violation lists, and stores the count result into the determination result storing unit 138 (S129). Furthermore, the least privilege violation determining unit 120 stores the data of the least privilege violation list and the relevant data into the determination result storing unit 138 (S131). The least privilege violation determining unit 120 reads out, as relevant data, the call date and time (Time) of the first trace log of the authority request API trace log storing unit 133 and the call date and time (Time) of the last trace log of the authority request API trace log storing unit 133, and further reads out the call date and time (Time) of the first trace log of the actual access API trace log storing unit 134 and the call date and time (Time) of the last trace log of the actual access API trace log storing unit 134. Then, the least privilege violation determining unit 120 specifies the start time (earliest call time) and the end time (latest call time). Furthermore, the least privilege violation determining unit 120 reads out the test target program name, the user name, the belonging group name, etc. from the authority request API trace log storing unit 133 and the actual access API trace log storing unit 134, and stores them into determination result storing unit 138.

Thereafter, the processing of the least privilege violation determining unit 120 is finished. Through the processing as described above, the user interface unit 100 can display the determination result by using the data stored in the determination result storing unit 138.

If the processing described above is executed, the least privilege violation can be determined by merely executing the test target program under an actual execution environment or an environment near to the actual execution environment without referring to either the source program or the specification. Furthermore, if the data of the least privilege violation list are analyzed, a condition under which the least privilege violation occurs can be specified. Accordingly, correction of the test target program can be efficiently executed.

An embodiment has been described, however, this invention is not limited to the above embodiment. Specifically, the functional block construction of FIG. 2 is an example, and it is not necessarily coincident with an actual program module construction. Particularly, a computer system in which the test target program 300 is executed may be different from a computer system in which the user interface unit 100 and the least privilege violation determining unit 120 are executed. Furthermore, there is a case where only the user interface unit 100 is provided to a client terminal and the other elements are provided to one or plurality of other computers.

The processing flow may contain operations which can be executed at the same time or whose execution order can be changed insofar as the processing result is unvaried. With respect to the data structure, the data structure is not limited to that shown in the figures insofar as the same result can be obtained.

The present invention described above is summarized below.

As described above, the data of the assumed access API are generated, and it is determined whether the data of the assumed access API can be associated with the data of the actual access API, whereby the least privilege violation can be determined according to the actual execution environment or the like with analyzing neither the source program nor the specification.

The actual access API search previously described above may be designed to contain the following operations. That is, when an assumed access API satisfying a predetermined condition is extracted, the data of the corresponding actual access API is stored into the authority request API trace log storing unit in association with the authority request API which is associated with the assumed access API in the assumed access API data storing unit. The least privilege violation determining method according to the first embodiment may further include an operation of searching for an authority request API which is not associated with the data of an actual access API in the authority request API trace log storing unit, and storing the data of the detected authority request API into the least privilege violation data storing unit. Accordingly, the least privilege violation can be detected with less leakage.

The actual access API search operation described above may include an operation of determining whether an actual access API and an assumed access API satisfy a second condition which represents that the actual access API and the assumed access API are substantially identical to each other, that is, there is no discrepancy therebetween when the assumed access API satisfying the condition is extracted. Further, the API search operation may include an operation of storing the data of the actual access API into the least privilege violation data storing unit when it is determined that the actual access API does not satisfy the second condition. Accordingly, an example embodiment may detect that an improper actual access API call is made.

Furthermore, the assumed access API generating operation described above may further include an operation of extracting an assumed access API corresponding to a privilege group contained in data of an authority request API from a privilege access rule storing unit for storing privilege access rule defining an assumed access API assumed to be output in accordance with a privilege when the privilege group contained in the data of the authority request API stored in the authority request API trace log storing unit is different from a privilege group contained in data of a second authority request API which is received just before the data of the authority request API, grouping the data of the assumed access API and storing the grouped data of the assumed access API into the assumed access API storing unit. Furthermore, the least privilege violation detecting operation may include an operation of storing data of authority request APIs associated with assumed access APIs of the same group in the assumed access API data storing unit into the least privilege violation data storing unit when any of the assumed access APIs of the same group are not associated with the data of the actual access APIs in the assumed access API trace log storing unit. Accordingly, when an improper privilege is set, an example embodiment may detect the improper privilege.

A least privilege violation detecting method according to an example embodiment comprises: an assumed access API generating operation of reading out, from an object access rule storing unit for storing an object access rule defined for every authority request API, a corresponding assumed access API which is assumed to be output from an test target program after an authority request API is output with respect to each of authority request APIs stored in an authority request API trace log storing unit for storing the data of the authority request APIs output from the test target program, and storing the data of the corresponding assumed access API in association with the authority request API into an assumed access API data storing unit; an operation of searching an assumed access API which satisfies a condition to be regarded as being output in response to an authority request API stored in an authority request API trace log storing unit in an assumed access API data storing unit with respect to each actual access API stored in an actual access API trace log storing unit for storing data of actual access APIs output from the test target program, an operation of storing the data of the corresponding actual access API into the authority request API trace log storing unit in association with the authority request API which is associated with the assumed access API in the assumed access API data storing unit; and an operation of searching an authority request API which is not associated with the data of the actual access API in the authority request API trace log storing unit, and storing the data of the detected authority request API into the minimum authority violation data storing unit.

If the authority request API as the origin is associated with the actual access API from the association between the actual access API and the assumed access API, the least privilege violation may be detected by searching the unassociated authority request API.

A program making a computer execute the minimum authority violation detecting method described above may be stored in a storage medium such as a flexible disc, CD-ROM, a magnetooptic disc, a semiconductor memory, a hard disk or the like, or a storage device. An intermediate processing result of the method may be temporarily stored in the storage device such as a main memory or the like, for example.

Figure 23:
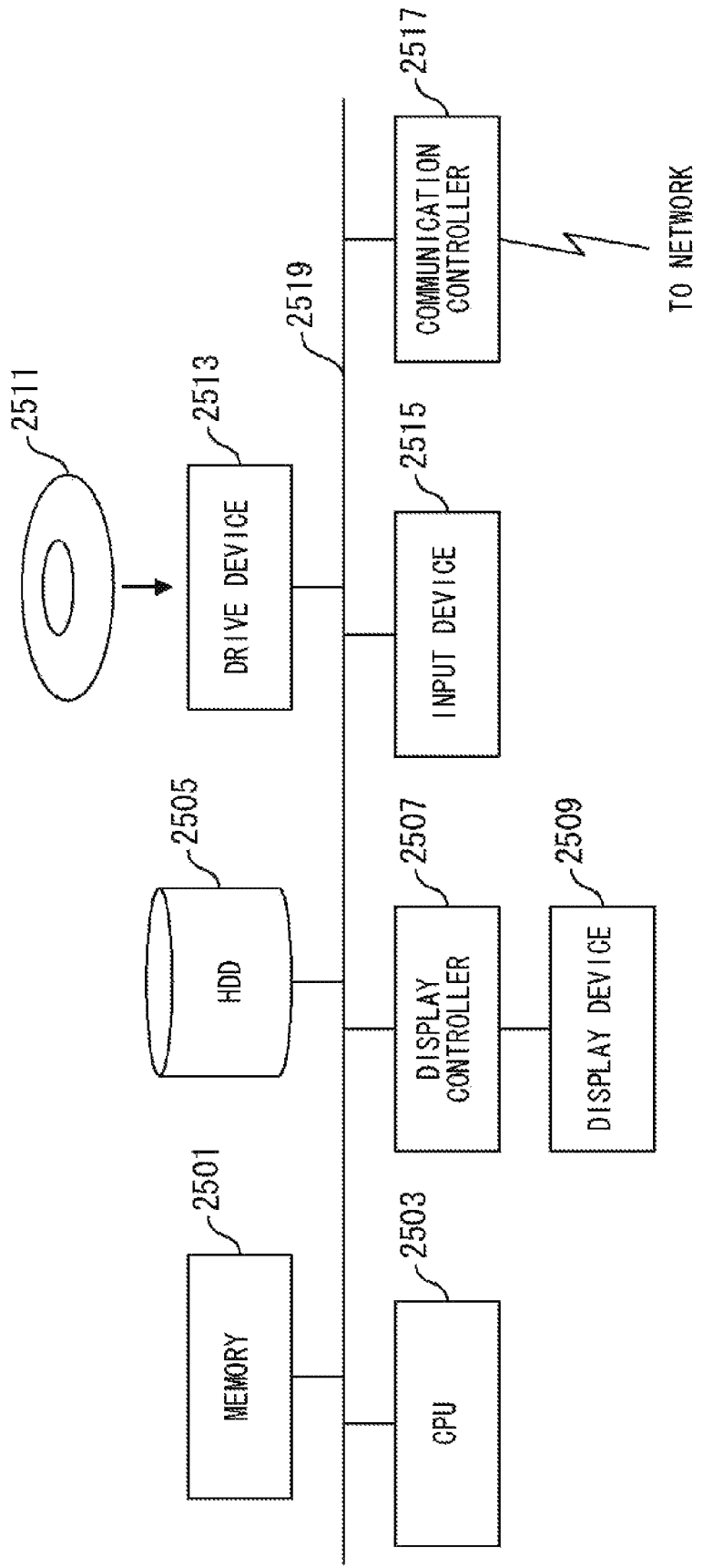
FIG. 23 is a functional block diagram showing a computer.

For example, the computer system shown in FIG. 2 is a computer device, and as shown in FIG. 23 may include a memory 2501, CPU 2503, a hard disk drive (HDD) 2505, a display controller 2507 connected to a display device 2509, a drive device 2513 for a removable disk 2511, an input device 2515 and a communication controller 2517 for connecting to a network are connected with a bus 2519. An OS and an application program for executing the processing in the above described embodiments may be stored in HDD 2505, and may be read out from HDD 2505 to the memory 2501 when executed by CPU 2503. CPU 2503 controls the display controller 2507, the communication controller 2517 and the drive device 2513 to execute necessary operations as occasion demands. Furthermore, with respect to data being processed, the data are stored in the memory 2501, and also stored in HDD 2505 if desired and/or necessary. In the above-described embodiments, the application program for executing the processing described above may be stored in a computer-readable removable disk 2511 to be distributed, and installed from the drive device 2513 into HDD 2505. In such a computer device, the hardware such as CPU 2503, the memory 2501, etc. as described above organically cooperate with the OS and application programs, thereby implementing the various kinds of functions as described above.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium storing a privilege violation detecting program, which when executed by a computer, causes the computer to detect a privilege violation of an test target program, wherein the privilege violation detecting program causes the computer to execute:
    storing, in an authority request API trace log storing unit, data of each of a plurality of authority request APIs output from the test target program;
    storing, in an object rule storing unit, rules providing a relationship between the authority request APIs and assumed access APIs, the assumed access APIs being APIs assumed to be called in response to receipt of a related authority request API;
    storing, in an actual access API trace log storing unit, data relating to actual access APIs, the actual access APIs being access APIs called in response to the authority request APIs;
    receiving an authority request API from the authority request API trace log storing unit;
    reading out, from the object access rule storing unit, an assumed access API assumed to be output in response to the received authority request API;
    determining an actual access API returned in response to the received authority request API from the actual access API trace log storing unit; and
    storing, into a minimum authority violation data storing unit, data of the received authority request API when the actual access API returned in response received authority request API does not match the read out assumed access API.

2. The non-transitory computer-readable storage medium according to claim 1, wherein
    the reading out reads out an assumed access API satisfying a condition; and the computer further executes:
    storing, into the authority request API trace log storing unit, data of the determined actual access API in association with the received authority request API which is associated with the read out assumed access API;
    searching for an authority request API which is not associated with the data of the determined actual access API in the authority request API trace log storing unit; and
    storing data of an authority request API into the minimum authority data storing unit data storing unit when the authority request API which is not associated with the data of the actual access API request is found.

3. The non-transitory computer-readable storage medium according to claim 1, wherein the reading out reads out an assumed access API satisfying a first condition; and the computer further executes:
    determining whether the determined actual access API and the read out assumed access API satisfy a second condition which represents that the determined actual access API and the read out assumed access API are substantially identical to each other; and
    storing data of the determined actual access API into the least privilege violation data storing unit when the determined actual access API and the read out assumed access API do not satisfy the second predetermined condition.

4. The non-transitory computer-readable storage medium according to claim 1, wherein the computer further executes:
    storing, in a privilege access rule storing unit, privilege access rules defining assumed access APIs to be output in accordance with a privilege when a privilege group included in data of the received authority request API is stored in the authority request API trace log;

extracting, from the authority access rule storing unit, an assumed access API corresponding to the privilege group when the privilege group contained in the data of the received authority request API stored in the authority request API trace log storing unit is different from a privilege group included in data of another authority request API previously received; and storing, in the minimum authority data storing unit, data of authority request APIs associated with the extracted assumed access API.

5. A non-transitory storage medium recorded with a minimum authority violation detecting program for making a computer detect minimum authority violation of a test target program, wherein the minimum authority violation detecting program making the computer execute:

storing, in an authority request API trace log storing unit, data of each of a plurality of authority request APIs output from the test target program;

storing, in an object rule storing unit, rules providing a relationship between the authority request APIs and assumed access APIs, the assumed access APIs being APIs assumed to be called in response to receipt of a related authority request API;

storing, in an actual access API trace log storing unit, data relating to actual access APIs, the actual access APIs being access APIs called in response to the authority request APIs;

reading out, from the object rule storing unit, an assumed access API which is assumed to be output from a test target program after an authority request API is output with respect to each of the authority request APIs stored in the privilege request API trace log storing unit;

storing data of the read out assumed access API in association with the authority request API into an assumed access API list storing unit;

searching for an assumed access API which satisfies a condition to be regarded as being output in response to an authority request API stored in the authority request API trace log storing unit in the assumed access API list storing unit with respect to each actual access API stored in an actual access API trace log storing unit;

storing data of a corresponding actual access API associated with the authority request API associated with the assumed access API in the assumed access API list storing unit into the authority request API trace log storing unit when the assumed access API satisfying the condition is detected;

searching for an authority request API with which data of the actual access API are not associated in the authority request API trace log storing unit;

storing the data of the detected assumed access API into the least privilege violation data storing unit; and outputting data stored in the least privilege violation data storing unit.

6. A privilege violation detecting device for detecting a privilege violation of a test target program, the device comprising:

a memory storing authority request API trace log data of each of a plurality of authority request APIs output from the test target program, rules providing a relationship between the authority request APIs and assumed access APIs, the assumed access APIs being APIs assumed to be called in response to receipt of a related authority request API, actual access API data relating to actual access APIs, the actual access APIs being access APIs called in response to the authority request APIs, the memory further storing instructions of a privilege violation detection program; and a processor that executes the instructions of the privilege violation detection program to:

acquire an authority request API from the memory, read out an assumed access API assumed to be output in response to the authority request API based on the rules stored in the memory, store data of the assumed access API in association with the authority request API into the memory, determine an actual access API returned in response to the authority request API based on the actual access API data, store the actual access API associated with the assumed access API into the memory when the assumed access API satisfies a condition, search for another assumed access API with which data of the actual access API are not associated in the memory, store, into the memory, the authority request API associated with the other assumed access API in the memory, and output data regarding the authority request API and the other assumed access API.

7. The privilege violation detecting device according to claim 6, wherein, the instructions of the privilege violation detection program further:

store, when an assumed access API satisfying the condition, the data of the corresponding actual access API in association with the authority request API which is associated with the read out assumed access API, search for an authority request API which is not associated with the data of the actual access API, and store the data of a detected authority request API.

8. The privilege violation detecting device according to claim 6, wherein, the instructions of the privilege violation detection program further:

determine whether the actual access API and the read out assumed access API satisfy a second condition which represents that the actual access API and the read out assumed access API are substantially identical to each other, and store the data of the actual access API when it is determined that the actual access API data and the read out assumed access API do not satisfy the second condition.

9. The privilege violation detecting device according to claim 6, wherein, the instructions of the privilege violation detection program further:

extract an assumed access API corresponding to a privilege group contained in data of a specific authority request API for storing a privilege access rule defining an assumed access API assumed to be output in accordance with a privilege when the privilege group included in the data of the specific authority request API is different from a privilege group contained in data of a second authority request API which is received before the data of the specific authority request API, and group and store the data of the assumed access API, and store data of authority request APIs associated with assumed access APIs of the same group when all the assumed access APIs of the same group are not associated with the data of the actual access APIs.

* * * * *